US012223637B2

(12) United States Patent
Pawar

(10) Patent No.: US 12,223,637 B2
(45) Date of Patent: Feb. 11, 2025

(54) SAFETY DEVICES, SYSTEMS, AND METHODS FOR MONITORING TOOLS IN CONNECTION WITH HAZARDOUS ENVIRONMENTS

(71) Applicant: EATON INTELLIGENT POWER LIMITED, Dublin (IE)

(72) Inventor: Sangram Pawar, Maharashtra (IN)

(73) Assignee: Eaton Intelligent Power Limited, Dublin (IE)

( * ) Notice: Subject to any disclaimer, the term of this patent is extended or adjusted under 35 U.S.C. 154(b) by 398 days.

(21) Appl. No.: 17/711,718

(22) Filed: Apr. 1, 2022

(65) Prior Publication Data

US 2023/0316495 A1  Oct. 5, 2023

(51) Int. Cl.
*G06T 7/00* (2017.01)
*G06T 7/11* (2017.01)

(52) U.S. Cl.
CPC .............. *G06T 7/0008* (2013.01); *G06T 7/11* (2017.01); *G06T 2207/30108* (2013.01)

(58) Field of Classification Search
CPC .................................................. G06T 7/0008
See application file for complete search history.

(56) References Cited

U.S. PATENT DOCUMENTS

| 10,507,066 | B2* | 12/2019 | DiMaio | A61B 34/30 |
| 10,656,614 | B2* | 5/2020 | Londo | G05B 19/048 |
| 10,959,056 | B1* | 3/2021 | Alsahlawi | G06Q 50/08 |
| 10,984,644 | B1* | 4/2021 | Alsahlawi | G08B 25/10 |
| 2010/0045423 | A1* | 2/2010 | Glickman | H04N 7/181 |
| | | | | 340/5.1 |
| 2010/0124356 | A1* | 5/2010 | Hampapur | G06V 20/53 |
| | | | | 382/103 |
| 2013/0328661 | A1* | 12/2013 | Phillips | G07C 9/00912 |
| | | | | 715/769 |
| 2013/0332323 | A1* | 12/2013 | Phillips | G07C 9/22 |
| | | | | 705/28 |
| 2014/0358740 | A1* | 12/2014 | Lipsey | H04W 4/80 |
| | | | | 705/28 |

(Continued)

FOREIGN PATENT DOCUMENTS

CN  103631155 A  *  3/2014
CN  205195109 U  *  4/2016

(Continued)

OTHER PUBLICATIONS

International Search Report and Written Opinion for International Application No. PCT/EP2023/025150, 19 pages.

*Primary Examiner* — Ted W Barnes
(74) *Attorney, Agent, or Firm* — Baker Botts L.L.P.

(57) ABSTRACT

A safety system for managing a plurality of tools is provided. The safety system includes at least one camera for capturing a plurality of images, in-real time, of at least one of a toolbox and at least one of the plurality of tools. The system includes at least one processor communicatively coupled to the at least one camera. The processor analyzes the plurality of images to identify an absent tool, the absent tool is not contained in a cavity of the toolbox. In response to identifying an absent tool, the processor automatically transmits a tool warning message to a user computing device. The tool warning message indicating the identified absent tool.

20 Claims, 12 Drawing Sheets

(56) References Cited

U.S. PATENT DOCUMENTS

| | | | | |
|---|---|---|---|---|
| 2015/0201166 A1* | 7/2015 | Glickman | ................ | B25H 3/00 |
| | | | | 348/159 |
| 2015/0377413 A1* | 12/2015 | Doettling | ............... | H04N 23/63 |
| | | | | 348/46 |
| 2019/0172189 A1* | 6/2019 | Pop | ...................... | G06V 10/147 |
| 2020/0410434 A1* | 12/2020 | Fly | ........................ | B25H 3/028 |
| 2021/0089774 A1* | 3/2021 | Lipsey | ................. | G06F 40/166 |
| 2021/0158207 A1* | 5/2021 | Alsahlawi | ................ | G06N 5/04 |
| 2022/0004162 A1* | 1/2022 | Kriveshko | .............. | F16P 3/147 |
| 2023/0237797 A1* | 7/2023 | Doken | .................... | G06T 11/00 |
| | | | | 345/633 |

FOREIGN PATENT DOCUMENTS

| | | | | | |
|---|---|---|---|---|---|
| CN | 105375374 B | * | 7/2017 | | |
| EP | 2858789 A2 | * | 4/2015 | ............... | B25H 3/00 |
| EP | 2974831 A2 | * | 1/2016 | ............... | B25H 3/00 |
| GB | 2454408 A | * | 5/2009 | ............... | B25H 3/00 |
| WO | WO-2008029159 A1 | * | 3/2008 | ............... | B25H 3/00 |
| WO | WO-2010017528 A2 | * | 2/2010 | ............... | B25H 3/00 |
| WO | WO-2010017530 A2 | * | 2/2010 | ............... | B25H 3/00 |
| WO | WO-2010017533 A2 | * | 2/2010 | ............... | B25H 3/00 |

* cited by examiner

SAFETY DEVICES, SYSTEMS, AND METHODS FOR MONITORING TOOLS IN CONNECTION WITH HAZARDOUS ENVIRONMENTS

BACKGROUND OF THE INVENTION

The field of the disclosure relates generally to tool management and safety systems for tasks performed in hazardous environments, and more particularly to systems, assemblies, and methods for monitoring a plurality of tools used by workers performing maintenance tasks in and around electrical operating electrical power systems.

A variety of tools exist for use by workers to perform a variety of tasks in, for example, the maintenance, repair, replacement, and/or installation and assembly tasks of components in electrical power systems. Preventing tools from being lost or left behind at a worksite is of practical concern for workers performing certain types of tasks. For example, inadvertently leaving a tool in certain locations may result in costly damage to equipment or perhaps increase risk of injury or harm to workers. In the electrical industry, for instance, tools left behind in proximity to energized electrical equipment may contribute to electrical fault conditions and electrical arcing conditions. For operating electrical power systems wherein ignitable gas, vapors or substances may be present, electrical fault conditions and arcing conditions may further present ignition risks and explosion concerns. Accordingly, aside from preventing tool loss, inventory management and monitoring of tools may enhance reliable operation of an electrical power system and safety of workers performing tasks in the electrical power system.

At least some known tool inventory management systems manage a plurality of tools, in an organized manner, creating accountability for workers when checking out and returning tools. For example, at least some known tool inventory managements systems utilize tags, attached to each tool, which must be scanned by workers, e.g., using a hand-held scanner, each time a tool is checked out and/or returned to a storage location, e.g., a toolbox. The scanning process is tedious and time consuming and therefore may be ignored by the user, rendering these systems ineffective. Other known tool inventory managements systems are associated with tool kits that have specific tool storage locations that use sensors, e.g., force sensors, infrared sensors, magnetic sensors, etc., to detect if the tool has been returned to the specific tool storage location. Numerous sensors positioned in proximity to a plurality of tools and/or tool storage locations is costly, and additionally, the large number of sensors makes these systems prone to damage and failure that may be costly to maintain or replace. While these types of tool inventory management systems may be useful in certain industries, they suffer from the various drawbacks described above and are not capable of addressing specific concerns posed by tools of workers performing tasks in electrical power systems.

Accordingly, there is a need for an effective safety system that manages a plurality of tools in connection with electrical power systems, that overcomes the drawbacks of known systems described above.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION

Figure 1A:
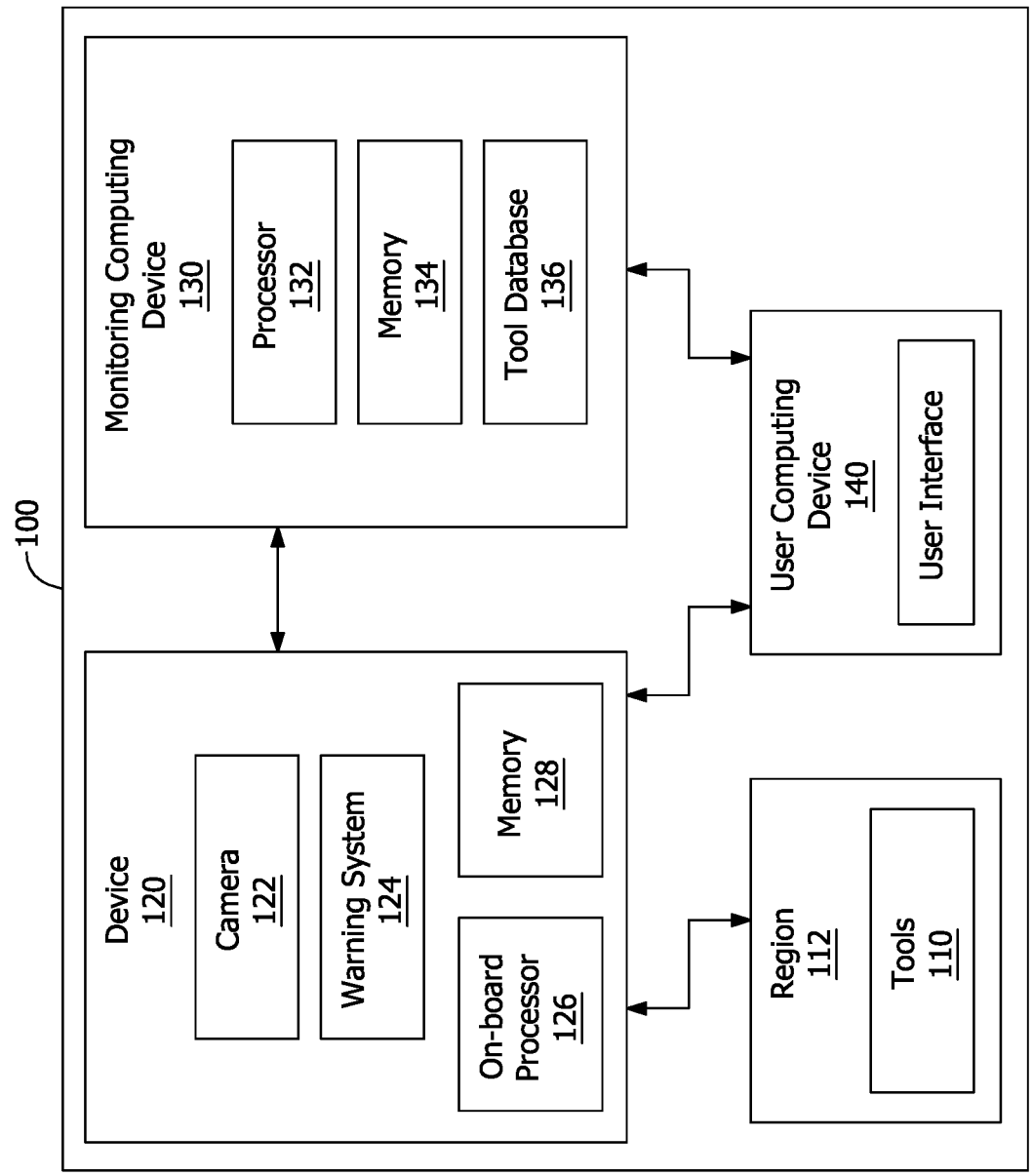
FIG. 1A is a block diagram of a safety system for monitoring a plurality of tools according to an exemplary embodiment of the present disclosure.

Electrical power systems generally pose hazards such as electrocution risks and arc flash risks to workers performing maintenance tasks, as well as generally uncontrollable release of energy in electrical fault conditions that can damage nearby equipment if certain electrical fault conditions arise. A variety of circuit protectors are known and in widespread use to mitigate consequences of electrical fault conditions in operating electrical power systems, but human error can sometimes contribute to electrical fault conditions, posing safety concerns and reliability concerns in the operation of the electrical power system. Such human error is preventable to some extent, especially concerning improper use of tools that includes but is not necessarily limited to inadvertently leaving a tool in a location where the presence of the tool increases a likelihood of an electrical fault condition occurring. Lost and mislaid tools in various locations of a large electrical power system, sometimes even behind closed doors of an electrical panel and the like, can be difficult to detect or prevent. Devices and systems are therefore needed to meet the unique needs of electrical power systems to identify tools left in dangerous locations and to notify power system administrators, overseers, and workers so that corrective actions can be promptly taken to avoid associated hazards.

Considering that electrical power systems sometimes operate within hazardous environments presenting a risk of explosion via ignition of a surrounding gas or vapor dusts, fibers, or flyings the concerns above are amplified concerning tool use and locations of tools in the power system. Such hazardous environments may arise, for example only, in petroleum refineries, petrochemical plants, grain silos, waste water and/or treatment facilities among other industrial facilities, wherein volatile conditions are produced in the ambient environment and present a heightened risk of fire or explosion. A temporary or sustained presence of airborne ignitable gas, ignitable vapors, ignitable dust or otherwise flammable substances presents substantial concerns regarding safe and reliable operation of such facilities overall, including but not limited to safe operation of the electrical power system itself, which in some instances by virtue of conventional circuit protector devices may produce ignition sources in normal operation and in the presence of an electrical fault. As such, a number of standards have been promulgated relating to electrical product use in explosive environments to improve safety in hazardous locations in view of an assessed probability of explosion or fire risk.

For example, Underwriter's Laboratories ("UL") standard UL 1203 sets forth Explosion-Proof and Dust-Ignition-Proof Electrical Equipment criteria for hazardous locations. Explosion-Proof and Dust-Ignition-Proof enclosures are available to enclose or contain electrical products. In combination with appropriate Explosion-Proof and Dust-Ignition-Proof enclosures, electrical equipment manufacturers may receive UL certification of compliance with the applicable rating standards for hazardous locations, and UL certification is an important aspect of a manufacturer's ability to successfully bring products to market in North America or any other market accepting of UL standard 1203.

The National Electric Code (NEC) generally classifies hazardous locations by class and division. Class 1 locations are those in which flammable vapors and gases may be present. Class II locations are those in which combustible dust may be found. Class III locations are those that are hazardous because of the presence of easily ignitable fibers or flyings. Considering Class 1, Division 1 covers locations where flammable gases or vapors may exist under normal operating conditions, under frequent repair or maintenance operations, or where breakdown or faulty operation of process equipment might also cause simultaneous failure of electrical equipment. Division 1 presents a greater risk of explosion than, for example, Division 2 where flammable gases or vapors are normally handled either in a closed system, confined within suitable enclosures, or are normally prevented by positive mechanical ventilation.

The International Electrotechnical Commission (IEC) likewise categorizes hazardous locations into Class I, Zone 0, 1, or 2 representing locations in which flammable gases or vapors are or may be airborne in an amount sufficient to produce explosive or ignitable mixtures. As defined in the IEC, a Class I, Zone 0 location is a location in which ignitable concentrations of flammable gases or vapors are present continuously or for long periods of time. A Class I, Zone 1 location is a location in which ignitable concentrations of flammable gases or vapors are likely to exist because of repair or maintenance operations or because of leakage or possible release of ignitable concentrations of flammable gases or vapors, or is a location that is adjacent to a Class I, Zone 0 location from which ignitable concentrations of vapors could be communicated.

While expressed a bit differently, IEC Zone 1 and NEC Division 2, in practice, generally converge to common locations in the assessment of hazardous environments. In view of modern environmental regulation and the concentrated nature of Division 1 and Zone 0 applications, most hazardous equipment, particularly switch gear products are installed for use in Division 2 or Zone 1 (or 2) areas. Given that electrical devices, such as those described below, can be ignition sources in certain circumstances, explosion-proof, flame-proof, or ignition proof enclosures are conventionally provided in NEC Division 2 locations and/or IEC Zone 1 locations to house electrical devices that pose ignition risk. The terms "explosion-proof" or "flame-proof" in this context, refer to enclosures that are designed to be capable of containing an internal explosion of a specified flammable vapor-air mixture. In addition, explosion-proof or flame-proof enclosures must operate at a safe temperature with respect to the surrounding atmosphere.

Of further concern, electrical power systems in industrial and commercial facilities typically operate at higher voltages and with high current than other electrical power systems. Higher voltage, higher current circuitry presents increased potential energy for electrical arcing events. Higher voltage, higher current circuitry likewise presents a possibility of undesirable electrical arcing conditions apart from electrical fault conditions, including but not necessarily limited to service and maintenance procedures performed by electrical power system personnel in and around electric panels and the like where circuit protectors such as overcurrent protection fuses are located. Improved arc flash mitigation features are accordingly desired from both circuit protection and safety perspectives. Method aspects will be in part apparent and in part explicitly discussed in the description below.

Conventional tool management systems are prone to user error. For example, known tool managements systems require the user to perform one or more logging and/or documentation steps when checking out/in one or more tools. For example, known systems use tags attached to each tool and the user may scan tags, e.g., using a scanner, when checking in/out tools. In other words, tools are not automatically checked in/out and a user may neglect to scan tools with little to no consequences or intervention from the tool management system. Furthermore, these known systems rely on the user's attention and memory to return tools that have been checked out. The tedious and time-consuming process of scanning tools when checking out/in tools may be neglected entirely. Furthermore, these systems do not intervene when a user inadvertently leaves a tool at a worksite. For example, known systems do not alert or warn users if tools are hazard risks.

A worker such as an electrician may perform one or more tasks in an electrical power system, which in some cases may operate within a hazardous environment, e.g., NEC Division 2 or IEC Zone 1 locations described above. Tasks may include routine maintenance, installation, replacement and/or inspection of electrical components such as circuit protectors and switching devices, for example, as well as establishing the mechanical and electrical connections of wires and cabling to distribute electrical power in a protected manner to desired electrical loads. The electrician typically carries a toolbox storing a variety of different tools that the electrician may utilize by hand to perform the one or more tasks. It is of the utmost importance that the electrician does not inadvertently leave tools behind in proximity to electrical equipment because the tool(s) may increase a likelihood of electrical fault conditions and/or create potential ignition risks in hazardous environments.

Intelligent systems, assemblies, and methods disclosed herein accordingly provide real-time tool monitoring of a plurality of tools used in connection with electrical power systems, whether installed in hazardous environments. As such, potential hazards associated with tools inadvertently left in specific locations in an electrical power system may be avoided. Further, preventive measures may be taken in response to alerts indicating that one or more tools are missing from the toolbox. Tool monitoring systems and methods disclosed herein are especially effective in identifying potential risks related to electrical enclosures in an electrical system prior to electrical fault conditions or ignition risks being realized that may be attributable to location of tools inadvertently left in monitored locations. Monitoring tools in real-time, while the electrician is still present in the hazardous environment, desirably encourages the electrician to account for all the tools, prior to leaving the area.

Figure 1B:
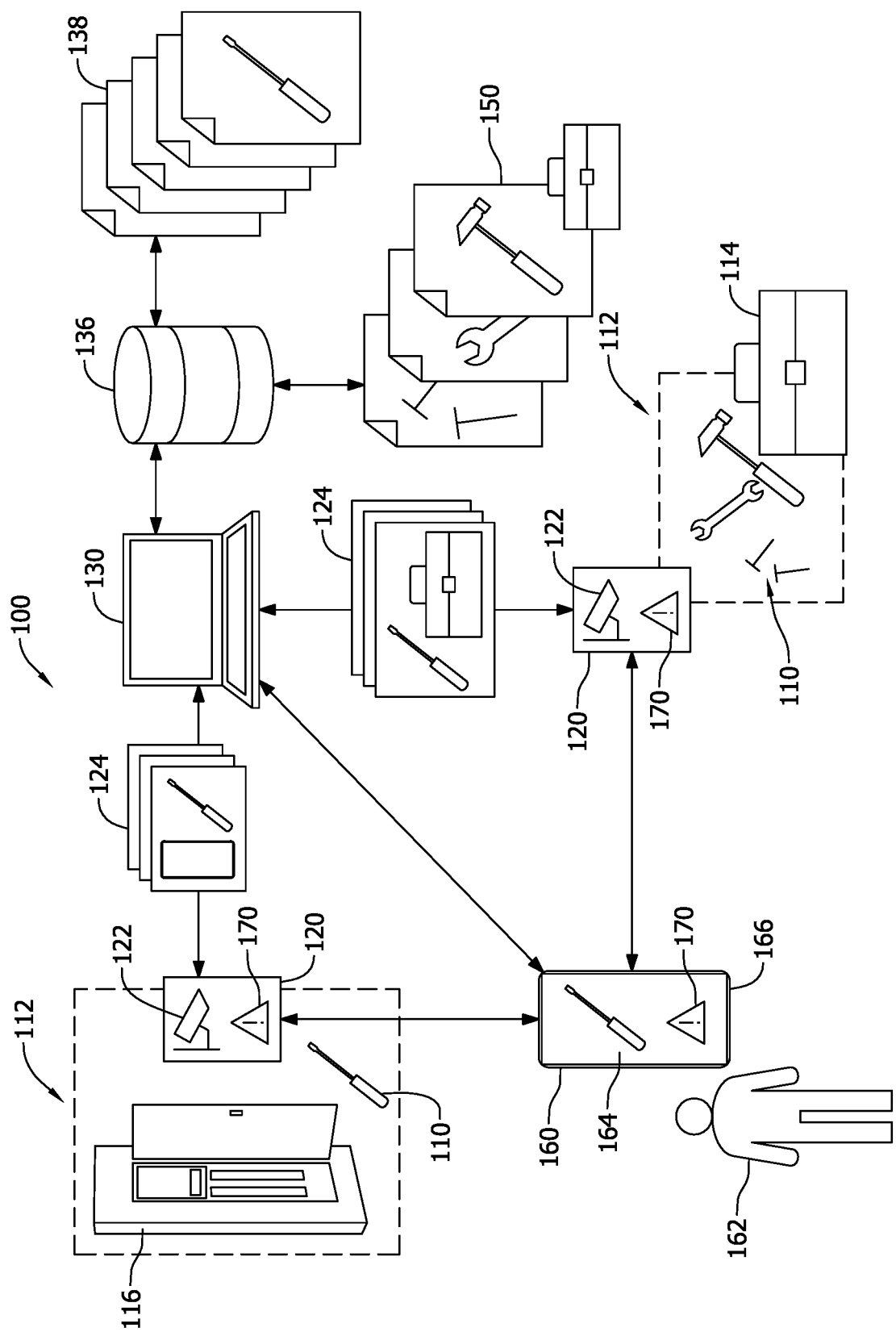
FIG. 1B is a schematic diagram of the safety system shown in FIG. 1A.

FIGS. 1A and 1B show an exemplary tool management and safety system 100. FIG. 1A is a block diagram of the system 100. FIG. 1B is a schematic diagram of the system 100.

The system 100 monitors one or more of a plurality of different tools 110 used within or in association with an electrical power system that may optionally be operating in a hazardous environment, e.g., NEC Division 2 or IEC Zone 1 locations described above, ensuring that the one or more tools 110 are not accidentally left near electrical components where the tools 110 pose electrical fault and arcing risks. The system 100 monitors one or more of the plurality of tools 110 contained within a region 112. In one exemplary embodiment, the system 100 monitors the one or more tools 110 within a toolbox 114 (FIG. 1B) that is used for storing and transporting the one or more tools 110. The toolbox 114 may be used to transport the one or more tools 110 to and from the electrically hazardous environment. In a further embodiment, the system 100 monitors the one or more tools 110 used near an electric panel 116 (FIG. 1B) of the electrical power system.

While described in the context of an electrical power system, the benefits of the systems may likewise apply to systems that are not necessarily electrical but that raise similar issues by worker use of tools and inadvertent tool placement in certain locations presenting increased safety concerns or reliability concerns for a monitored industrial system. As such, the electrical power system application is described for purposes of illustration rather than limitation.

The system 100 includes a device 120 including at least one camera 122 for capturing a plurality of images 124 of the region 112, enabling the system 100 to monitor one or more tools 110 contained within the region 112. The region 112 may be associated with the field of view of the camera 122. For example, the camera 122 may capture images 124 of the toolbox 114 (e.g., images 124 of the interior of the toolbox 114 and/or a location surrounding the toolbox 114), the electric panel 116 (e.g., images 124 of the electric panel 116 and/or a location surrounding the electric panel 116) and/or images 124 of one or more of the plurality of tools 110. The camera 122 may be a video camera that captures a video. In the exemplary embodiment, the camera 122 captures images 124 in real-time and/or captures a live stream video. The real-time image capturing capability of the camera 122 enables the system 100 to monitor one or more of the plurality of tools 110 and/or the region 112, in real-time. In some embodiments, the device 120 includes an on-board processor 126 and memory 128 that are communicatively coupled to the camera 122.

The system 100 includes a monitoring computing device 130 that is communicatively coupled to the device 120. In the exemplary embodiment, the device 120 is located locally relative to the region 112, e.g., the device 120 is located in proximity to the electric panel 116, the toolbox 114, and/or to one or more of the plurality of tools 110. In some embodiments, the device 120 is mounted to, or formed integrally with, the toolbox 114 and/or the electric panel 116. The monitoring computing device 130 may be located remotely from the region 112, e.g., the monitoring computing device 130 is located remotely from the device 120, the one or more tools 110, the toolbox 114, and/or the electric panel 116. In some embodiments, the monitoring computing device 130 may be located within the electrical power system. The monitoring computing device 130 may be a server computing device. In one embodiment, the monitoring computing device 130 is cloud-based. The monitoring computing device 130 may communicate with the device 120 and/or the camera 122 through wireless communication. Alternatively, the monitoring computing device 130 may communicate with the device 120 and/or the camera 122 through wired communication. The device 120 and/or the camera 122 may upload data stored in the memory 128 of the device 120 to the monitoring computing device 130 periodically. In some embodiments, the device 120 and/or the camera 122 uploads the data in real time to the monitoring computing device 130. In some embodiments, the camera 122 automatically transmits images 124 to the monitoring computing device 130. In some embodiments, the monitoring computing device 130 may send out a request to the device 120 initiating the camera 122 to capture and transmit images 124.

In some embodiments, the monitoring computing device 130 includes a processor-based microcontroller including a processor 132 and a memory 134 wherein executable instructions, commands, and control algorithms, as well as other data and information needed to satisfactorily operate the system 100, are stored. The memory 134 may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set circuits (RISC), application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based."

At least one of the on-board processor 126, the processor 132, or a combination of the on-board processor 126 and processor 132, analyzes the images 124 enabling the system 100 to monitor one or more of the plurality of tools 110 and the region 112, as described in detail herein. The monitoring computing device 130 may be described herein as functioning to analyze the images 124 however, at least one of the device 120 and/or the monitoring computing device 130 is capable of analyzing images 124. Accordingly, descriptions of one or more processes performed by the monitoring computing device 130 should not limit the scope of capabilities of the device 120. In other words, the device 120 could be utilized to perform one or more processes performed by the monitoring computing device 130.

In the exemplary embodiment, the monitoring computing device 130 analyzes the images 124, received from the camera 122 in real-time to identify a safety concern associated with one or more of the tools. Specifically, the monitoring computing device 130 analyzes the images 124 to determine at least one of i) the presence of one or more tools 110 captured in the images 124, and/or ii) absence of one or more tools 110 not captured in the images 124. The safety concern may include determining that one or more tools 110 are left in proximity to the electric panel 116. The safety concern may include determining that one or more tools 110 are absent from the toolbox 114. The monitoring computing device 130 may analyze the images 124 to identify safety concerns using methods described in further detail below in exemplary embodiments. Alternatively, and/or additionally, the monitoring computing device 130 may analyze the images 124 using any suitable image processing techniques that enable the system 100 to function as described herein.

Figure 2:
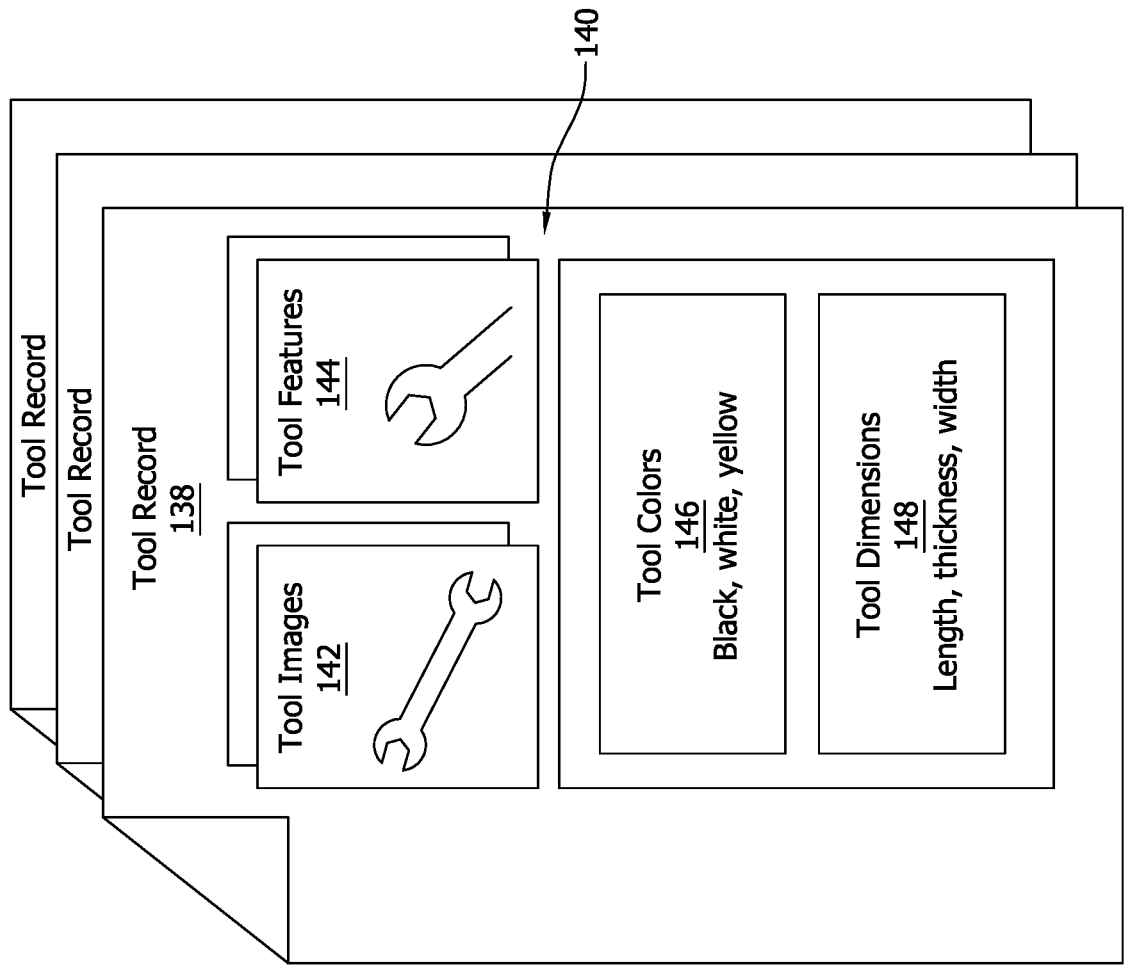
FIG. 2 is an exemplary tool record for use with the safety system shown in FIGS. 1A and 1B.

The memory 134 may include and/or is communicatively coupled to a tool database 136 storing a plurality of tool records 138. Each individual tool record 138 contains tool specific information 140 associated with an individual tool 110. The monitoring computing device 130 may analyze the images 124 using, at least in part, tool specific information 140 contained in the tool records 138. FIG. 2 shows an exemplary tool record 138 for use with system 100. The tool records 138 includes one or more tool images 142. For example, the tool images 142 includes a perspective view of the tool 110 and/or the tool images 142 may include one or more tool images 142 from various perspectives. Additionally, the tool record 138 may include one or more tool features 144. The tool features 144 may include one or more detailed images of the tool feature 144. For example, the image of the tool feature 144 may include an image of a handle of the tool 110 and/or an image of a working portion of the tool 110. Tool records 138 may further include one or more tool colors 146 of the tool 110. The tool records 138 may further include one or more tool dimensions 148 associated with a tool 110. Tool dimensions 148 may include a length, a width, an area, a diameter, and/or a weight associated with the tool 110 and/or a portion of the tool 110. The tool specific information 140 contained in the tool record 138 may include any information regarding the tool 110 that enables the monitoring computing device 130 to analyze the images 124.

In the exemplary embodiment, the system 100 further includes a toolbox inventory list 150 stored within at least one of the memory 134, the tool database 136, and/or the memory 128. The toolbox inventory list 150 includes a list of tool records 138 representing each of the tools 110 contained in the toolbox 114 and/or representing one or more tools 110 used in connection with the toolbox 114, e.g., transported by the toolbox 114. The toolbox inventory list 150 is intended to represent a list of tools 110 that are currently in use with the toolbox 114. Accordingly, the toolbox inventory list 150 may be updated periodically, daily, or as frequently as necessary, such that the toolbox inventory list 150 is an accurate representation of one or more tools 110 used in connection with the toolbox 114. The monitoring computing device 130 may use the toolbox inventory list 150 when analyzing the images 124 to determine if one or more tools 110 are absent from the toolbox 114, as described in further detail herein.

In further reference to FIGS. 1A and 1B, in the exemplary embodiment, the system 100 further includes a user computing device 160 that is communicatively coupled to the device 120 and/or the monitoring computing device 130. The user computing device 160 may be associated, and/or accessible to, a user 162, e.g., an electrician or an operator. In some embodiments, the monitoring computing device 130 is the user computing device 160. The user computing device 160 may include a web-enabled phone (e.g., a "smartphone"), a personal digital assistant, a laptop computer, a cellular phone, a tablet, a phablet, or other web-based connectable equipment that the user 162 may use to communicate with the device 120 and/or the monitoring computing device 130. The user computing device 160 includes at least one media output 164 for presenting information to the user 162. Media output 164 is any component enabled to convey information to the user 162, e.g., audio device, visual device, and/or tactile device. In some embodiments, the media output 164 includes a display device such as a liquid crystal display (LCD), light emitting diode display, and/or electronic link display. The media output 164 includes an audio output device, such as a speaker or headphones. The user computing device 160 includes a user interface 166 that receives at least one input from the user 162. The user interface 166 may include one or more buttons, e.g., a keypad and/or digital keypad, allowing the user 162 to transmit one or more messages to the monitoring computing device 130 and/or the device 120.

In the exemplary embodiment, the user computing device 160 can be used to view images 124 captured by the camera 122, in real-time. The media output 164 may display one or more of the plurality of images 124 received from the camera 122. The media output 164 may display a live feed video stream of the toolbox 114 and/or the electric panel 116, allowing the user 162 to participate in monitoring the plurality of tools 110. The user media output 164 may also display one or more of the tool records 138. The user 162 may interact with system 100, e.g., communicate with the device 120 and/or the monitoring computing device 130, using the media output 164 and/or the user interface 166. The user 162 may use the user interface 166 to transmit and receive one or more messages with the monitoring computing device 130 and/or device 120. For example, the user 162 may use the user interface 166 to transmit a request message to the camera 122, initiating the camera 122 to transmit images 124 to the user computing device 160.

In the exemplary embodiment, the system 100 further includes one or more warning systems 170 for alerting the user 162 of a safety concern. The warning system 170 may include at least one of a visual display for displaying a visual warning, an audio device for emitting an audible warning, and/or a tactile device for generating a tactile warning. The warning system 170 is communicatively coupled to at least one of the monitoring computing device 130, the device 120, and/or the user computing device 160. In response to the monitoring computing device 130 identifying one or more safety concerns, the monitoring computing device 130 transmits a warning message to the warning system 170 causing the warning system 170 to present an alert to the user 162, warning the user 162 of the safety concern. For example, an alert generated by the warning system 170 prompts the user 162 to return one or more tools 110 to the toolbox 114 and/or to remove one or more tools 110 from the electric panel 116, thereby thwarting an arcing risk associated with leaving tools 110 behind in certain locations of the electrical power system. The real-time capability of the device 120 and the warning system 170 enables the system 100 to prompt the user 162 to account for all of the plurality of tools 110 while the user 162 is at the electrically hazardous environment, before the user 162 leaves the environment.

In the exemplary embodiment, the user computing device 160 functions as the warning system 170. In response to determining a safety concern, the monitoring computing device 130 transmits one or more of the warning messages to the user computing device 160. The warning message includes instructions executable by the user computing device 160. The user computing device 160 executes the one or more instructions contained in the warning message causing the user computing device 160 to present information to the user 162 regarding the safety concern. For example, in the event that the monitoring computing device 130 determines that one or more tools 110 are absent from the toolbox 114, the monitoring computing device 130 transmits an instruction message to the user computing device 160 causing the user computing device 160 to display, using the media output 264, one or more tool records 138 associated with the absent tools 110. The instructions may cause the user computing device 160 to emit an audible alert and/or generate a tactile alert.

Figure 3:
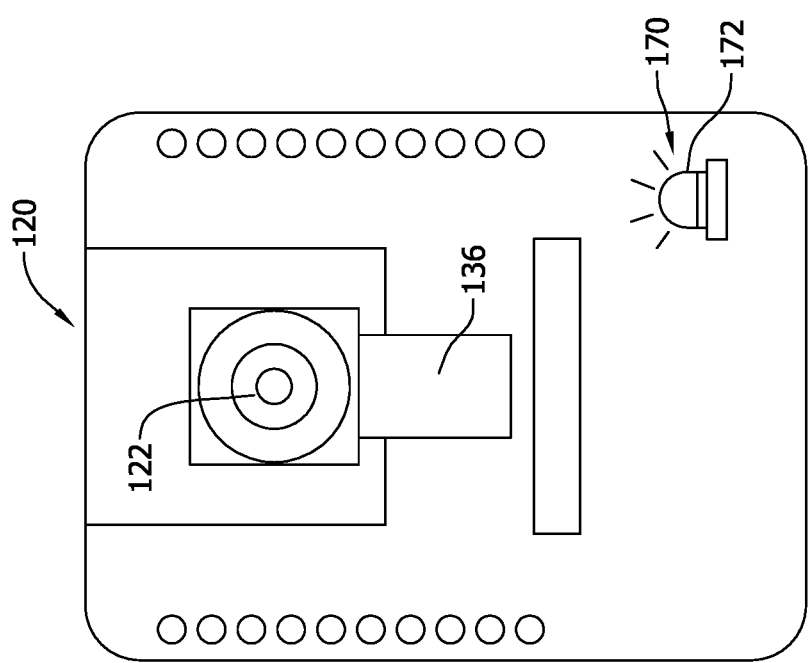
FIG. 3 is an exemplary embodiment of a device for use with the safety system shown in FIGS. 1A and 1B.

In some example embodiments, the warning system 170 may be integrated with the device 120 (see FIG. 3). For example, the device 120 may further include an output 172. The safety concerns identified by the monitoring computing device 130 is communicated to the output 172 through wired communication such as Ethernet, or through wireless communication such as Wi-Fi or through radio waves. The output 172 may send information to the user computing device 160, through wired communication such as Ethernet, or through wireless communication such as Wi-Fi or through radio waves. The output 172 may be positioned inside the electrically hazardous environment. In some embodiments, the output 172 is a LED light which illuminates to alert the user 162 that a safety concern has been identified by the monitoring computing device 130. In some embodiments, the output 172 includes a display.

FIG. 3 shows a plan view of an exemplary embodiment of the device 120. The device 120 includes the camera 122 communicatively coupled to the on-board processor 126 and memory 128. In some embodiments, the device 120 is selectively positionable allowing a user 162 to adjust the field of view of the camera 122. The device 120 may be retrofit onto an existing toolbox 114. Alternatively, and/or additionally, the device 120 may be retrofit onto an existing electric panel 116. The device 120 may include one or more attachment features (not shown), e.g., openings, clips, screws, magnets, etc., that allows the device 120 to be coupled to the toolbox 114, the electric panel 116, and/or another mounting structure. The device 120 further includes a power supply (not shown), for supplying power to the camera 122, the on-board processor 126 and/or the memory 128. The power supply may include a battery, a rechargeable battery, and/or a connection for receiving power supplied from an external source.

The device 120 has an overall shape and size convenient for retrofitting the device 120 onto existing components. In the exemplary embodiment, the device 120 has a thickness of between 1 and 5 millimeters (mm), a length between 25 and 76 mm and a width between 25 and 50 mm. In another embodiment, the device 120 has a thickness of between 5 and 10 mm, a length between 50 and 100 mm and a width between 30 and 75 mm. The dimensions of the device 120 are such that the device 120 may be positioned within or on a toolbox 114 without spatially interfering with the tools 110 stored in the toolbox 114. The device 120 has a weight less than 0.0453 kilograms (kg) (0.1 lbs.) or alternatively, the device 120 has a weight less than 0.1133 kilograms (to 0.25 lbs.)—. Accordingly, the device 120 does not add significant weight to the toolbox 114 and does not limit the available storage space within the toolbox 114. Additionally, the device 120 may be coupled to the electric panel 116 without interfering with components of the electric panel 116.

Figure 4:
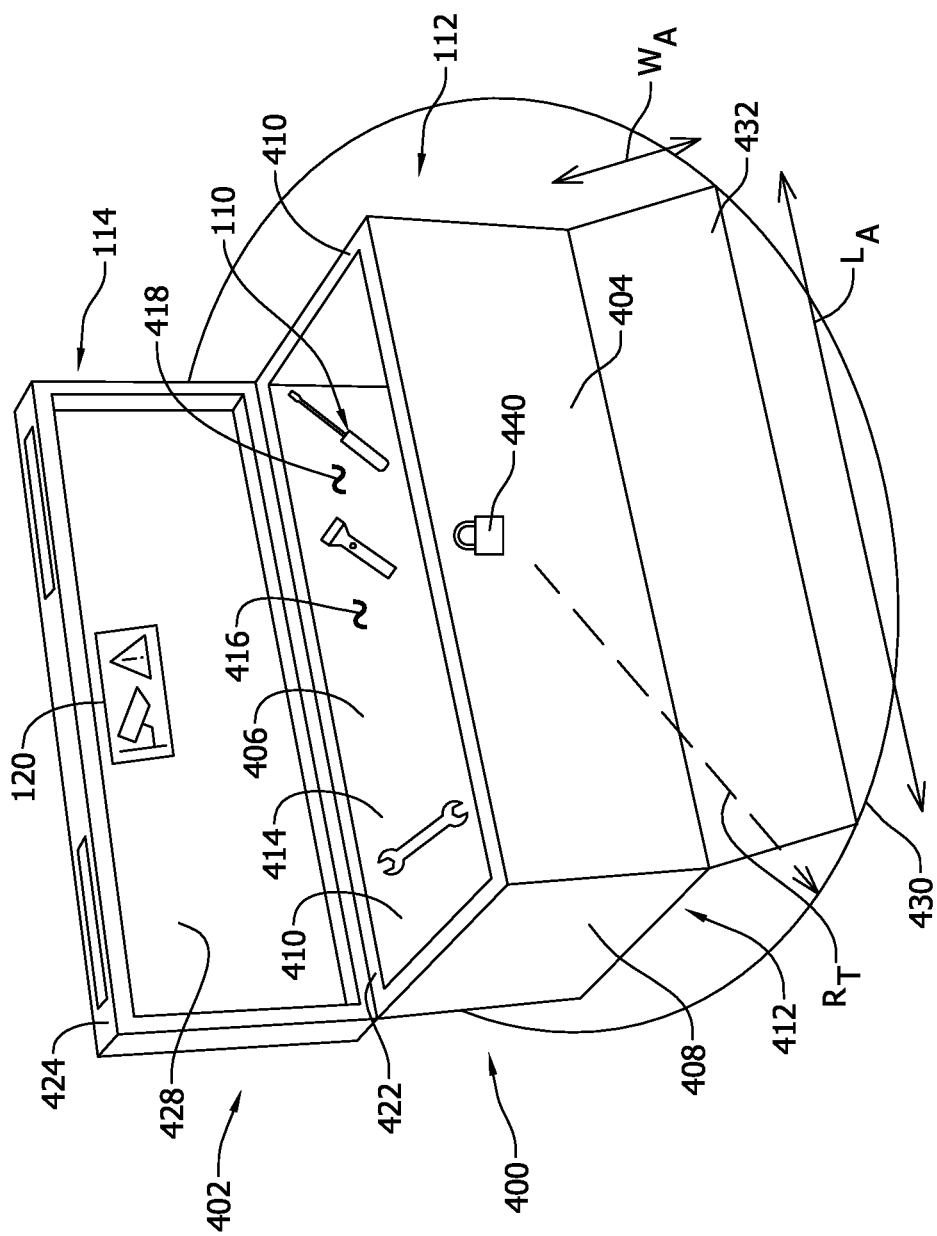
FIG. 4 is an exemplary embodiment of a toolbox storing a plurality of tools for use with the safety system shown in FIGS. 1A and 1B.

FIG. 4 is a perspective view of an exemplary embodiment of the toolbox 114 for use with the safety system 100. The toolbox 114 includes a container 400 and a lid 402. The container 400 includes a front wall 404, a rear wall 406 and a pair of side walls 408, 410. The walls 404, 406, 408, and 410 extend from a base 412 of the container 400. The toolbox 114 further includes an interior surface 414 that defines a cavity 416 for storing one or more of the plurality of tools 110. The walls 404, 406, 408, and 410 define an opening 418 that leads into the cavity 416. One or more tools 110 may be passed through the opening 418 to be positioned within the cavity 416. The lid 402 selectively covers and uncovers the opening 418. The lid 402 includes a first end 422 and a second end 424, the first end 422 being rotationally coupled to the rear wall 406. The lid 402 may be rotated about the first end 422 to selectively cover or uncover the opening 418 of the container 400. In an alternative embodiment, the lid 402 is not rotationally coupled to one of the walls 404, 406, 408, and 410, rather, the lid 402 may be maneuvered to selectively cover or uncover the opening 418 of the toolbox 114. In some embodiments, the toolbox 114 includes one or more handles (not show) for lifting and/or maneuvering the container 400 and/or the lid 402.

In the exemplary embodiment, the toolbox 114 is portable and may be moved from one location to another location. For example, the user 162 may fill the toolbox 114 with one or more tools 110 and then transport the toolbox 114 to a worksite, e.g., to the electrically hazardous environment. In alternative embodiments, the toolbox 114 is located locally within or near the electrically hazardous environment, e.g., the toolbox 114 is stationary.

In the illustrated embodiment, the device 120 is coupled to a first surface 428 of the lid 402 of the toolbox 114. In some embodiments, the device 120 may be coupled to one or more of the walls 404, 406, 408, and 410 of the toolbox 114. The device 120 is coupled in any position and/or orientation, relative to the toolbox 114, allowing the camera 122 to capture images 124 in the region 112. The region 112 includes a field of view of the camera 122 suitable to enable the system 100 to monitor one or more of the plurality of tools 110 in connection with the toolbox 114. The region 112 is sized and shaped to allow the camera 122 to capture images 124 of one or more of the plurality of tools 110 contained within the cavity 416 of the toolbox 114 and/or capture images 124 of the interior surface 414 of the toolbox 114.

In some embodiments, in addition to capturing images 124 of the toolbox 114, the camera 122 may be positioned such that the region 112 includes an area surrounding the toolbox 114. For example, the camera 122 may be positioned to capture images 124 in a circular region 430 surrounding the toolbox 114. A radius RT of the circular region 430 may be between 0.3048 and 0.6096 meters (1 to 2 feet), for example. In another example, the camera 122 may be positioned to capture images 124 in a rectangular region 432 in proximity to the front wall 4044 of the toolbox 114. The rectangular region 432 may have a length LA extending outward from the front wall between 0.3048 and 0.6096 meters (1 to 2 feet) and extending along a width WA. Alternatively and/or additionally, the camera 122 may be positioned such that the region 112 has any suitable size and/or shape that enables the system 100 to monitoring the plurality of tools 110 using in connection with the toolbox.

The camera 122 transmits the images 124 to the on-board processor 126 and/or to the monitoring computing device 130 for further analysis. The images 124 are analyzed in real-time to determine if one or more tools 110 are present within the cavity 416 and/or if one or more tools 110 are absent from the cavity 416. The monitoring computing device 130 may analyze the images 124 using one or more methods described herein, see FIGS. 7 and 9, for example.

Alternatively, the monitoring computing device 130 may analyze the images 124 using suitable image processing techniques that enable the system 100 to function as described herein.

The monitoring computing device 130 may automatically generate the toolbox inventory list 150 by monitoring one or more tools 110 as they are added to the toolbox 114. Specifically, the camera 122 captures images 124 while the user 162 is moving tools 110 through the opening 418 to be placed within the cavity 416 of the toolbox 114. The monitoring computing device 130 analyzes the images 124 to determine what tools 110 are being added to the toolbox 114. The monitoring computing device 130 retrieves one or more tool records 138 from the tool database 136, based on the determination of what tools 110 are being added to the toolbox 114, and generates the toolbox inventory list 150 based on the retrieved tool records 138. The toolbox inventory list 150 includes tool records 138 which may be a subset of all the tool records 138 contained in the tool database 136. In some embodiments, the user 162 may utilize the user computing device 160 to update and/or build the toolbox inventory list 150.

Likewise, while the user 162 is removing tools 110 from the cavity 416, the monitoring computing device 130 analyzes the images 124 to determine what tools 110 are being removed from the toolbox. In the electrical power system application, the tools 110 may include a set of screwdrivers, a set of wrenches, a set of wire cutters, cabling, ammeters, voltmeters and other known tools for the worker/electrician to more or less universally perform needed tasks in multiple locations in and around the electrical power system. The aforementioned tools are exemplary only, however, and different combinations of tools may be provided in other contemplated embodiments. The system is generally flexible and scalable for use with different toolboxes having any number of tools desired of varying types allowing workers to complete needed tasks.

In the exemplary embodiment, the toolbox 114 includes a smart lock 440 that is connectable between the lid 402 and at least one of the walls 404, 406, 408, and 410. The smart lock 440 is selectively positionable in either a locked or an unlocked position. In the locked position, the lid 402 is arranged to completely cover the opening 418, and the lid 402 is secured, via the smart lock 440, to at least one of the walls 404, 406, 408, and 410 thereby preventing or limiting access to the contents of the toolbox 114. In the unlocked position, the smart lock 440 does not inhibit opening 418 and/or closing of the lid 402 of the toolbox 114. When the smart lock 440 is in the unlocked position, the contents of the cavity 416 of the toolbox 114 are accessible.

The smart lock 440 may also be arranged in either an enabled configuration or a disable configuration. In the enabled configuration, the smart lock 440 may be selectively positioned in either the locked or unlocked position. In the disabled configuration, the smart lock 440 is fixed in the unlocked position. In other words, in the disabled configuration, the smart lock 440 may not be arranged in the locked position. The smart lock 440 is communicatively coupled to the monitoring computing device 130. The monitoring computing device 130 transmits one or more instructions to the smart lock 440 causing the smart lock 440 to be arranged in either the enabled or disabled configurations. Upon identifying a safety concern, the monitoring computing device 130 may disable the smart lock 440, preventing the user 162 from locking the lid 402 of the toolbox 114. The inconvenience of being unable to lock the lid 402 to secure the contents of the toolbox 114, may prompt the user 162 to address the safety concern. For example, the monitoring computing device 130 may identify that one or more tools 110, contained on the toolbox inventory list 150, are absent from the toolbox 114, and then the monitoring computing device 130 transmits an instruction message to the smart lock 440 causing the smart lock 440 to be disabled. Additionally, and/or alternatively, the monitoring computing device 130 may determine that one or more tools 110 are left in the electrically hazardous environment, and the monitoring computing device 130 transmits an instruction message causing the smart lock 440 to be disabled.

In another embodiment, the smart lock 440 may be arranged to prevent the lid 402 from being closed. In yet another embodiment, the system 100 may include a bypass feature that allows the user 162 to disable the smart lock 440. For example, the user 162 may use the user computing device 160 to communicate with the monitoring computing device 130 and/or the smart lock 440 to disable the smart lock 440, allowing the user 162 to close the lid 402 and/or lock the lid 402. Additionally, and/or alternatively, the user 162 may use the user computing device 160 to communicate with the monitoring computing device 130 and/or the smart lock 440 in order to lock and/or unlock the smart lock 440.

Figure 5:
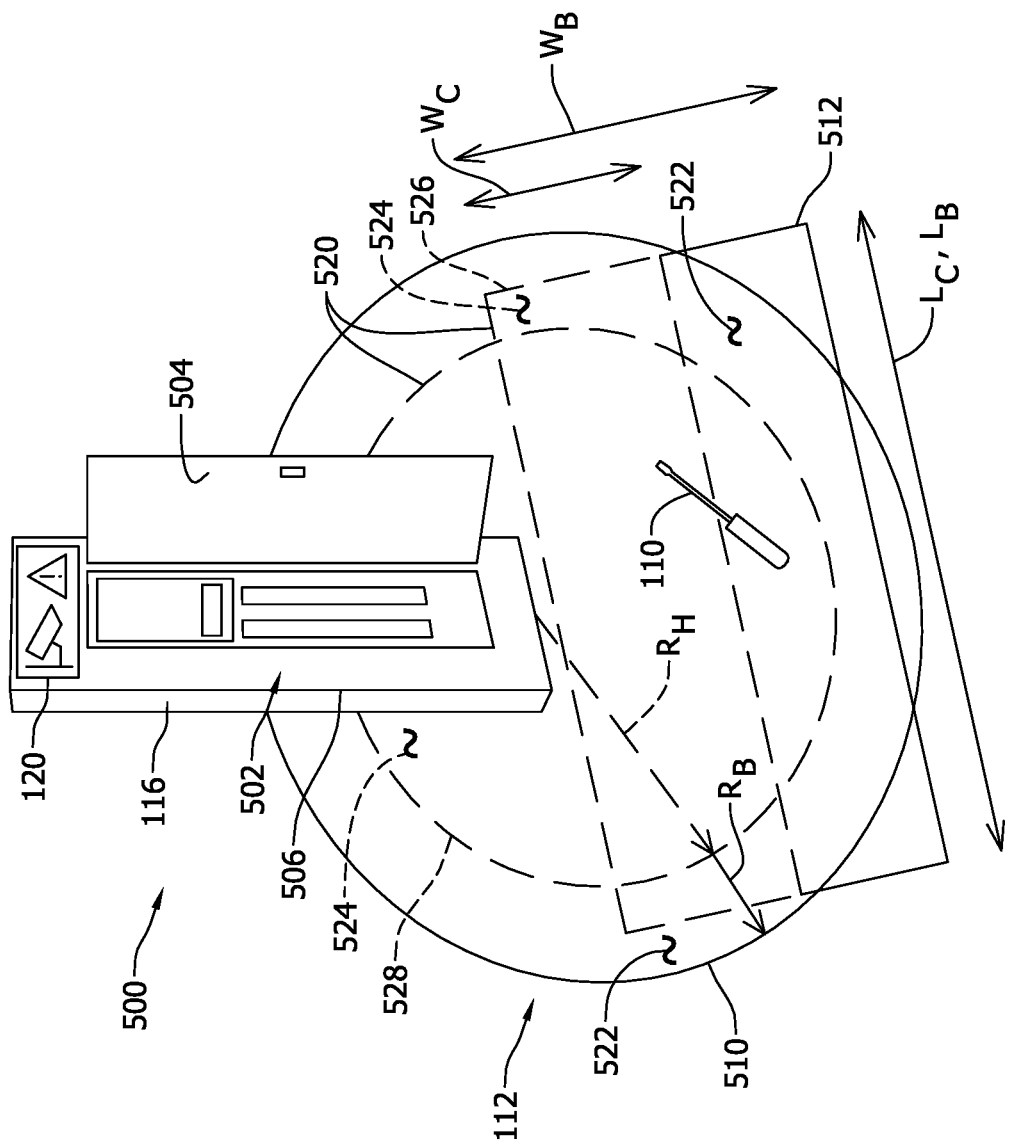
FIG. 5 is an exemplary embodiment of an electrical enclosure for use with the safety system shown in FIGS. 1A and 1B.

FIG. 5 is a perspective view of an exemplary embodiment of the electric panel 116 for use with system 100. The electric panel 116 may be located within the electrically hazardous environment, as described above.

The electric panel 116 may include an electrical enclosure assembly 500. The electrical enclosure assembly 500 includes an electrical enclosure 502. The electrical enclosure 502 is a metal housing or cabinet that contains electrical or electronic equipment and devices and their connections to the electrical power system via wires or cables and the like. Such an electrical enclosure 502 serves to protect electrical devices inside and contain electrical energy inside the enclosure to mitigate electrocution risks and or ignition risks to the ambient environment in the operation of the electrical power system. The electrical enclosure 502 may include a cover or door 504 and a body 506 in the form of a housing, panel, or chassis familiar to those in the art. The door 504 is coupled to the body 506 and opens and closes access to the interior of the body 506. The electrical enclosure 502 may enclose any electrical component or device, or combinations of components and devices, including but not necessarily limited to switches and circuit protectors discussed above. The electrical enclosure 502 in some cases may be explosion proof and flameproof.

In the exemplary embodiment, the device 120 is coupled to the electric panel 116. In an alternative embodiment, the device 120 may be coupled to a mounting structure (not shown), that is in proximity to the electric panel 116. The device 120 is position and orientated such that the camera 122 captures images 124 of the region 112 enabling system 100 to monitoring one or more tools 110 used in proximity to the electrical enclosure 102. In one embodiment, the camera 122 may be positioned to capture images 124 in a circular region 510 surrounding the electric enclosure 502. A radius $R_B$ of the circular region 510 may be between 0.3048 and 1.524 meters (1 to 5 feet), for example. In another example, the camera 122 may be positioned and orientated to capture images 124 in a rectangular region 512 in proximity to the electric panel 116. The rectangular region 512 may have a length $L_B$ between 0.3048 and 1.524 meters (1 to 5 feet) extending outward from the electric panel 116 The rectangular region 512 may have a width WB of between 0.3048 and 1.524 meters (1 and 5 feet). Alternatively and/or additionally, the region 112 may be any suitable size and/or shape such that the camera 122 captures images 124 surrounding the electric panel 116 enabling system 100 to monitor one or more tools 110 used in connection with the electric panel 116.

Figure 7:
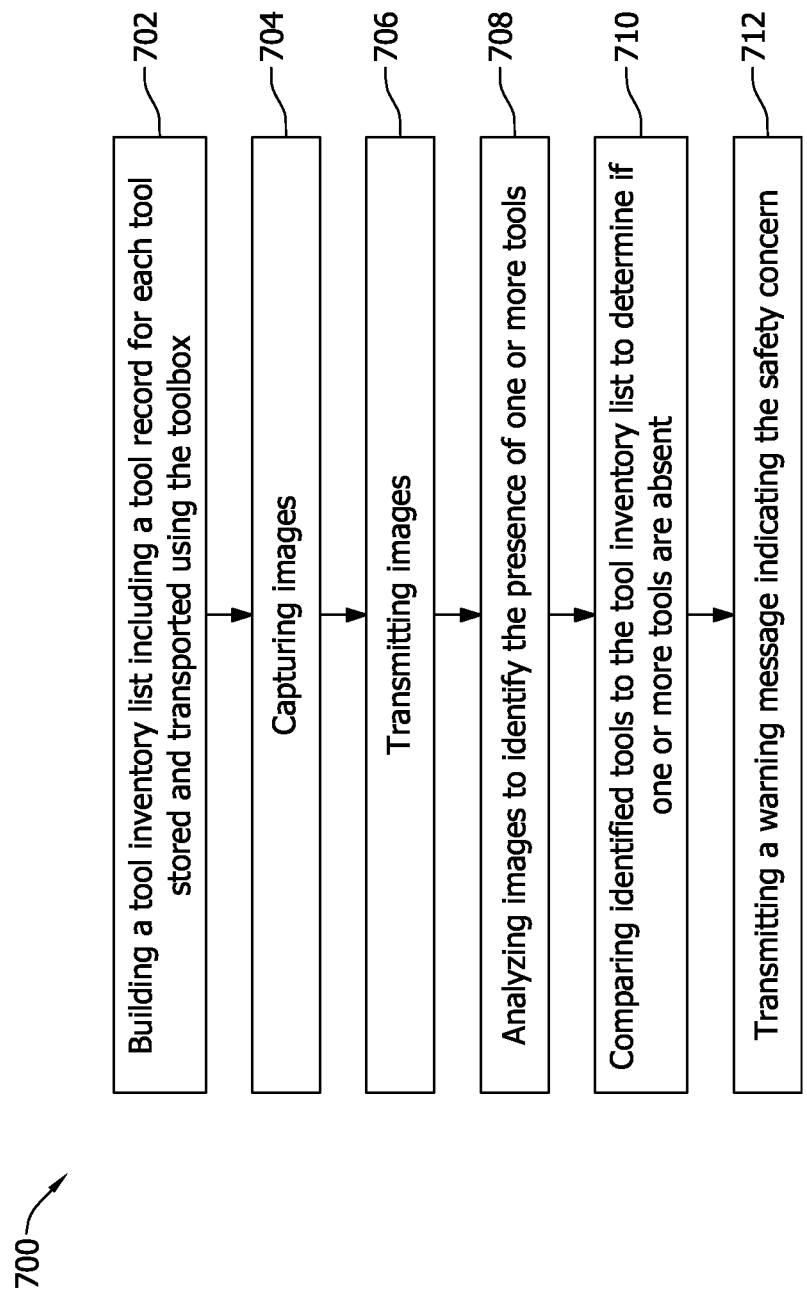
FIG. 7 is a flow chart of an exemplary method of monitoring tools stored within a toolbox in connection with the safety system shown in FIGS. 1A and 1B.
Figure 8:
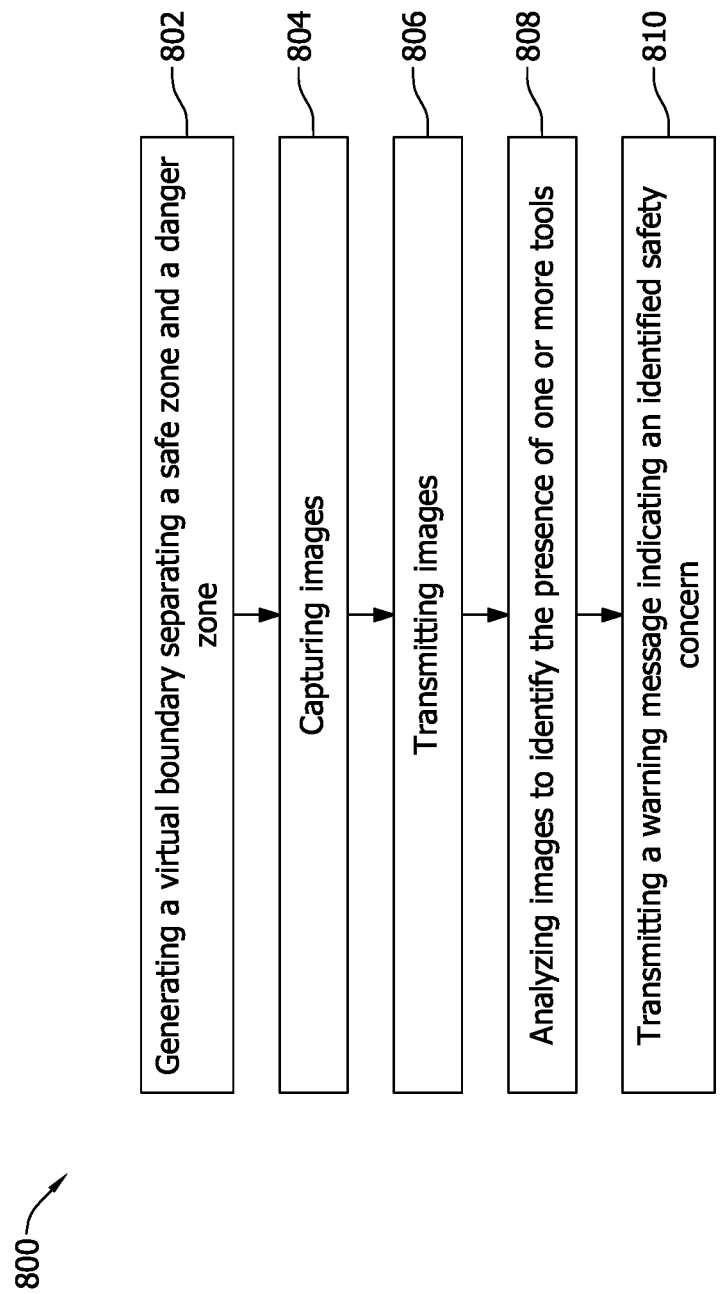
FIG. 8 is a flow chart of an exemplary method of monitoring tools used in connection with an electrical enclosure in connection with the safety system shown in FIGS. 1A and 1B.

The camera 122 transmits images 124 to the monitoring computing device 130 for analyzing using one or more methods described in detail herein, see FIGS. 7-8, for example, to monitoring the electric panel 116 and the region 112 surrounding, and including, the electric panel 116. The monitoring computing device 130 generates a virtual boundary 520 in proximity to the electric panel 116. The virtual boundary 520 separates a safe zone 522 and a hazard zone 524. The hazard zone 524 may be closer to the electric panel 116 compared with the safe zone 522. The hazard zone 524 may be associated with an area near any electrical equipment, wherein if one or more of the tools 110 were left behind, the tools 110 would present an arc risk to the electrical equipment. Likewise, the safe zone 522 is associated with an area that is a safe distance from the electrical equipment, e.g., if the tools 110 are left behind in the safe zone 522, the tools 110 would be at a reduced arc risk compared to the tools 110 left in the hazard zone 524. In some embodiments, the hazard zone 524 may be a rectangular hazard zone 526 with a length of $L_c$ and a width of $W_c$. In some embodiments, the hazard zone 524 may be a circular hazard zone 528 with a radius $R_H$. The virtual boundary 520 may be any shape and size that enables the system 100 to monitoring one or more tools 110 used with the electric panel 116.

Figure 6:
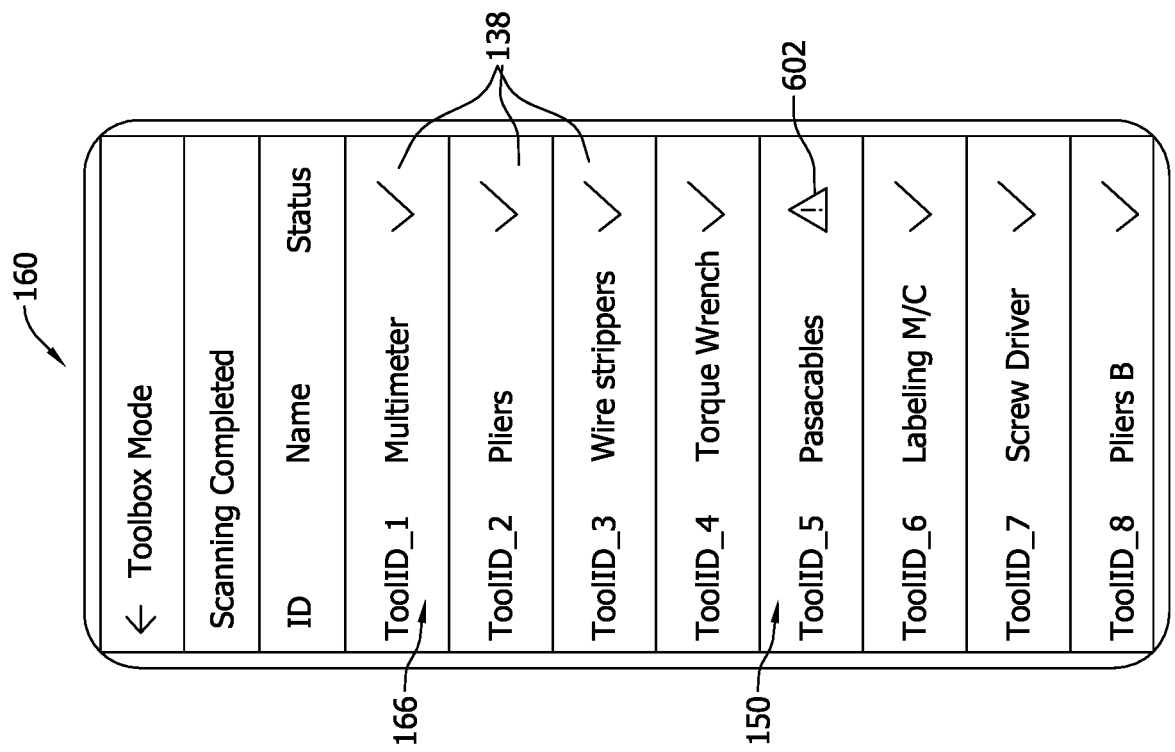
FIG. 6 is an exemplary user interface used to monitor the plurality of tools for use with the system shown in FIGS. 1A and 1B.

The camera 122 captures images 124 of the hazard zone 524, the virtual boundary 520, and/or at least a portion of the safe zone 522. The images 124 are analyzed in real-time such that the monitoring computing device 130 identifies one or more tools 110 in real-time as the tools 110 are approaching the virtual boundary 520 and/or as one or more tools 110 are crossing the boundary. The monitoring computing device 130 analyzes the images 124 to identify one or more tools 110 that cross the boundary from the safe zone 522 into the hazard zone 524. The monitoring computing device 130 also analyzes the images 124 to determine when, or if, the tool 110 crosses over the boundary from the hazard zone 524 into the safe zone 522. If the monitoring computing device 130 determines that a tool 110 has crossed the virtual boundary 520 into the hazard zone 524, but did not subsequently cross the virtual boundary 520 to return to the safe zone 522, the monitoring computing device 130 identifies a safety concern. The monitoring computing device 130 determination of the safety concern triggers the monitoring computing device 130 to transmit a warning message to the warning system 170 causing the warning system 170 to alert the user 162 that one or more tools 110 are left behind or that one or more tools 110 are left behind within the hazard zone 524. FIG. 6 illustrates a view of an exemplary user interface 166 displayed on the user computing device 160. The user interface 166 enables the user 162 to participate in monitoring of one or more of the plurality of tools 110 using system 100 shown in FIGS. 1A and 1B. In the exemplary embodiment, the user interface 166 may be displayed on any suitable user computing device 160 enabling a user 162 to monitor one or more of a plurality of tools 110, in real-time.

In the exemplary embodiment, the user interface 166 displays one or more tools records 138 associated with the toolbox inventory list 150. The user interface 166 also displays one or more warnings 602 indicating that one or more tools are absent from the toolbox.

In some embodiments, the user interface 166 displays in real-time the images 124 captured by the camera 122. The user interface 166 may display a plurality of images 124 and/or a live-stream video captured by the camera 122. Accordingly, the user 162 may view, in real-time, the plurality of tools 110, the toolbox 114, and/or the electric panel 116. In addition, the user interface 166 may display images and/or video of the region 112 captured by the camera 122. For example, the user interface 166 may display images and/or videos of the safe zone 522 and the hazard zone 524.

FIG. 7 is a flowchart of an exemplary method 700 of monitoring one or more of a plurality of tools 110 used in connection with the toolbox 114 and the system 100. In particular, method 700 determines at least one of i) if one or more tools 110 are absent from the toolbox 114 and/or ii) if one or more tools 110 are present within the toolbox 114.

The method 700 includes building 702 the toolbox inventory list 150. The toolbox inventory list 150 includes one or more of tool records 138, each tool record 138 representing each of the one or more tools 110 being stored and/or transported using the toolbox 114. Building 702 the toolbox inventory list 150 may be associated with an initial preparation period. The preparation period includes a period of time when the user 162 is selecting tools 110 to be placed into the toolbox 114 for storage and transportation. For example, at the start of the user's 162 work shift, the toolbox 114 may be empty and then subsequently, the user 162 may select one or more tools 110 and then the user 162 may position the selected tools 110 within the toolbox 114 for transportation and storage of the tools 110 during the user's 162 work shift. Accordingly, the toolbox inventory list 150 accurately reflects one or more tools 110 currently in use or in connection with the toolbox 114. Furthermore, building 702 the toolbox inventory list 150 may be repeated each time the toolbox 114 is used or each time one or more additional tools 110 are placed within the cavity 416 of the toolbox 114. In addition, building 702 the toolbox inventory list 150 may include the monitoring computing device 130 updating, e.g., adding, removing, and/or replacing one or more tool records 138 of the toolbox inventory list 150.

In one embodiment, building 702 the toolbox inventory list 150 may be partially and/or completely automatically performed by the monitoring computing device 130. Building 702 of the toolbox inventory list 150 may include the camera 122 capturing images 124, in real-time, as the user 162 is positioning tools 110 within the cavity 416 of the toolbox 114. The monitoring computing device 130 analyzes the images 124, as described in further detail below, see FIG. 7-9, for example, to identify tools 110 in the images 124. Identifying one or more tools 110 may include comparing one or more tool features identified in the images 124 to one or more tool features 144 stored in the tool records 138. Identifying one or more tools 110 may include comparing one or more tool colors 146 identified in the images 124 to one or more tool colors 146 stored in the tool records 138.

Once a tool 110 is identified, the monitoring computing device 130 retrieves the corresponding tool record 138 from the tool database 136 and then the monitoring computing device 130 stores the tool record 138 in the toolbox inventory list 150. The monitoring computing device 130 may store the toolbox inventory list 150 within the memory 134 and/or in the tool database 136. In some embodiments, building 702 the toolbox inventory list 150 further includes the monitoring computing device 130 transmitting one or more messages to the user 162 computing device 160 causing the user computing device 160 to prompt the user 162 to confirm the toolbox inventory list 150, update the toolbox inventory list 150, and/or select one or more tool records 138 to be stored in the toolbox inventory list 150.

Building 702 the toolbox inventory list 150 may be achieved, at least partially, using the user computing device 160. For example, the user 162 may interact with the user interface 166 to select one or more of the tool records 138 to be stored within the toolbox inventory list 150. In another example, the user 162 may use the user computing device 160 to capture images 124 of tools 110 before the user positions the tools 110 within the toolbox 114. The user computing device 160 transmits the images 124 to the monitoring computing device 130 which identifies the tool 110, and then the monitoring computing device 130 retrieves the corresponding tool record 138 to build the toolbox inventory list 150. In some embodiments, building 702 the toolbox inventory list 150 includes the monitoring computing device 130 generating one or more new tool records 138.

Subsequent to the preparation period, the method 700 includes one or more steps for monitoring the one or more tools 110 used in connection with the toolbox 114. The method 700 further includes capturing 704, using the camera 122, a plurality of images 124 of at least one of the cavity 416 of the toolbox 114, one or more of a plurality of tools 110 contained within the toolbox 114, an area surrounding the toolbox 114, and/or images 124 of tools 110 being actively moved into and out of the toolbox 114. The method 700 includes transmitting 706 the images 124 from the camera 122 to the monitoring computing device 130. In some embodiments, transmitting 706 the images 124 includes the device 120 uploading images 124 to monitoring computing device 130. The monitoring computing device 130 may be located remotely from the device 120 and the camera 122, such as in the cloud. The captured images 124 may be uploaded periodically. In some embodiments, the captured images 124 are be uploaded in real time, where the captured images 124 are uploaded immediately.

The method 700 includes analyzing 708 the images 124 to identify if one or more tools 110 are present within the toolbox 114. The monitoring computing device 130 analyzes the images 124 using one or more methods described in detail herein, see FIGS. 7-9, for example. Alternatively, the monitoring computing device 130 may use any suitable image processing methodologies to analyze and/or identify tools 110 captured in the images 124 which are either present and/or absent from the toolbox 114.

Once the images 124 have been analyzed to identify the presence of one or more tools 110 contained in the toolbox 114, the method further includes comparing 710 the one or more identified tools 110 that are present within the toolbox 114 to the toolbox inventory list 150, to determine what tools 110 are absent, if any.

In response to determining that one or more tools 110 are absent from the toolbox 114, the method 700 further includes transmitting 712, from the monitoring computing device 130 to the warning system 170, one or more notification message. As described above, the warning system 170 may be incorporated with the device 120 and/or the user computing device 160. The notification message identifies the one or more tools 110 determined as being absent from the toolbox 114. The notification message may include one or more instructions which may be executed by the user computing device 160 causing the user computing device 160 to present an alert to the user 162 and may prompt the user 162 to find and/or return the absent tool to the toolbox 114. The user computing device 160 may emit an audible warning, display a visual warning, and/or generate a tactile warning, to be interpreted by the user 162. In some embodiments, the user computing device 160 may display one or more messages to the user 162, the messages including the determined absent tool 110 and/or an image of the determined absent tool 110.

The method 700 may further include the monitoring computing device 130 transmitting one or more instruction messages to the smart lock 440. If the monitoring computing device 130 determines that one or more tools 110 are absent from the toolbox 114, the monitoring computing device 130 transmits a disable instruction to the smart lock 440, causing the smart lock 440 to be disabled. If the monitoring computing device 130 determines that all of the tools 110 listed on the toolbox inventory list 150 are contained within the toolbox 114, the monitoring computing device 130 transmits an enabled instruction to the smart lock 440, causing the smart lock 440 to be enabled.

FIG. 8 is a flowchart of an exemplary method 800 of monitoring one or more tools 110 used in connection with the electric panel 116.

In the exemplary method, the device 120 is integrated with the electric panel 116. In alternative embodiments, the method 800 may first include installing the device 120 in proximity to the electric panel 116.

The method 800 includes generating 802, using the monitoring computing device 130, the virtual boundary 520 in proximity to the electric panel 116. The virtual boundary 520 separates the safe zone 522 from the hazard zone 524. The hazard zone 524 is associated with an area that has an increased arcing risk compared to the safe zone 522. In particular, the hazard zone 524 is an area in proximity to the electric panel 116 that if a tool 110 is left behind, the tool 110 may present an arc risk to the electric panel 116. The safe zone 522 is an area that is sufficiently spaced from the hazard zone 524 and/or the electric panel 116 such that tools 110 in the safe zone 522 are unlikely, or less likely to create an arc risk compared to the hazard zone 524.

Generating the virtual boundary 520 may include capturing a plurality of images 124 using the camera 122 and uploading the images 124 to the monitoring computing device 130. Capturing a plurality of images 124 includes capturing images 124 of the region 112. For example, images 124 may include at least one of the electric panel 116, an area surrounding the electric panel 116, and/or at least one of the plurality of tools 110. Generating the virtual boundary 520 may include the monitoring computing device 130 superimposing the virtual boundary 520 on the one or more images 124. The virtual boundary 520 may be associated with a reference line used by the monitoring computing device 130 to distinguish between the hazard zone 524 and the safe zone 522. In some embodiments, the monitoring computing device 130 automatically generates the virtual boundary 520, however, in some embodiments, the user 162 may select or generate the virtual boundary 520 using the user interface 166 of the user computing device 160. For example, the user interface 166 may present a plurality of available virtual boundaries 520 and the user 162 may select from the available virtual boundaries 520, a virtual boundary 520 that suits the needs of the user 162 and/or the hazardous environment. Alternatively, and/or additionally, the user interface 166 may allow the user 162 to select a radius or a distance between the electric panel 116 and the virtual boundary 520.

In the exemplary embodiment, generating the virtual boundary 520 includes the monitoring computing device 130 generating the hazard zone 524 and the safe zone 522. In some embodiments, generating the virtual boundary 520 includes the monitoring computing device 130 generating the rectangular hazard zone 526 in proximity to the electric panel 116. In other embodiments, generating the virtual boundary 520 includes the monitoring computing device 130 generating the circular hazard zone 528. Generating the virtual boundary 520 may include the monitoring computing device 130 generating any suitable virtual boundary 520, having any suitable shape and size, that enables the system 100 to function as described herein. In the exemplary embodiment, the electric panel 116 is contained, or at least partially contained, within the hazard zone 524.

The method 800 further includes capturing 804 images 124 of the region 112, including capturing 804 images of at least a portion of the electric panel 116, the virtual boundary 520, the hazard zone 524, and the safe zone 522. The method 800 includes transmitting 806 the captured images 124 to the monitoring computing device 130. The method 800 includes analyzing 808 the captured images 124 to identify one or more tools 110 captured images 124. Analyzing 808 the images 124 may also include determine a location of the identified tool in relation to the virtual boundary 520. Determining the location of the identified tool 110 may include determining that the tool 110 is in the hazard zone 524, the tool 110 is in the safe zone 522, the tool 110 has crossed from the safe zone 522 into the hazard zone 524, and/or the tool 110 has crossed from the hazard zone 524 into the safe zone 522. In some embodiments, determining the location of the identified tool includes determine a distance between the tool and the virtual boundary 520.

Analyzing 808 the images may include the monitoring computing device 130 identifying a safety concern. The safety concern may include determining that one or more tools 110 have crossed the virtual boundary 520 from the safe zone 522 into the hazard zone 524, but did not subsequently re-cross the virtual boundary 520 from the hazard zone 524 into the safe zone 522. The safety concern may include determining that one or more tools 110 are disposed within the hazard zone 524. The safety concern may include determining that one or more tools 110 are located within a threshold distance to the hazard zone 524. If the monitoring computing device 130 identifies one or more of the safety concerns, the method further includes, transmitting 810, from the monitoring computing device 130 to the warning system 170 one or more warning messages. As described above, the system 100 may be integrated with the device 120 and/or the user computing device 160. The warning message causes the warning system 170 to present one or more alerts to the user 162. The method 800 may include the warning system 170 emitting an audible warning, a visual warning, and/or a tactile warning.

If no safety concern is identified, the method 800 may further include continuing to repeat one or more steps of the method 800. If no safety concern is determined, the method 800 repeats generating 802 the virtual boundary 520, capturing 804 images 124, transmitting 806 images, and analyzing 808 the images 124 enabling the monitoring computing device 130 to continue to monitor one or more tools 110 used in connection with the electric panel 116.

Figure 9:
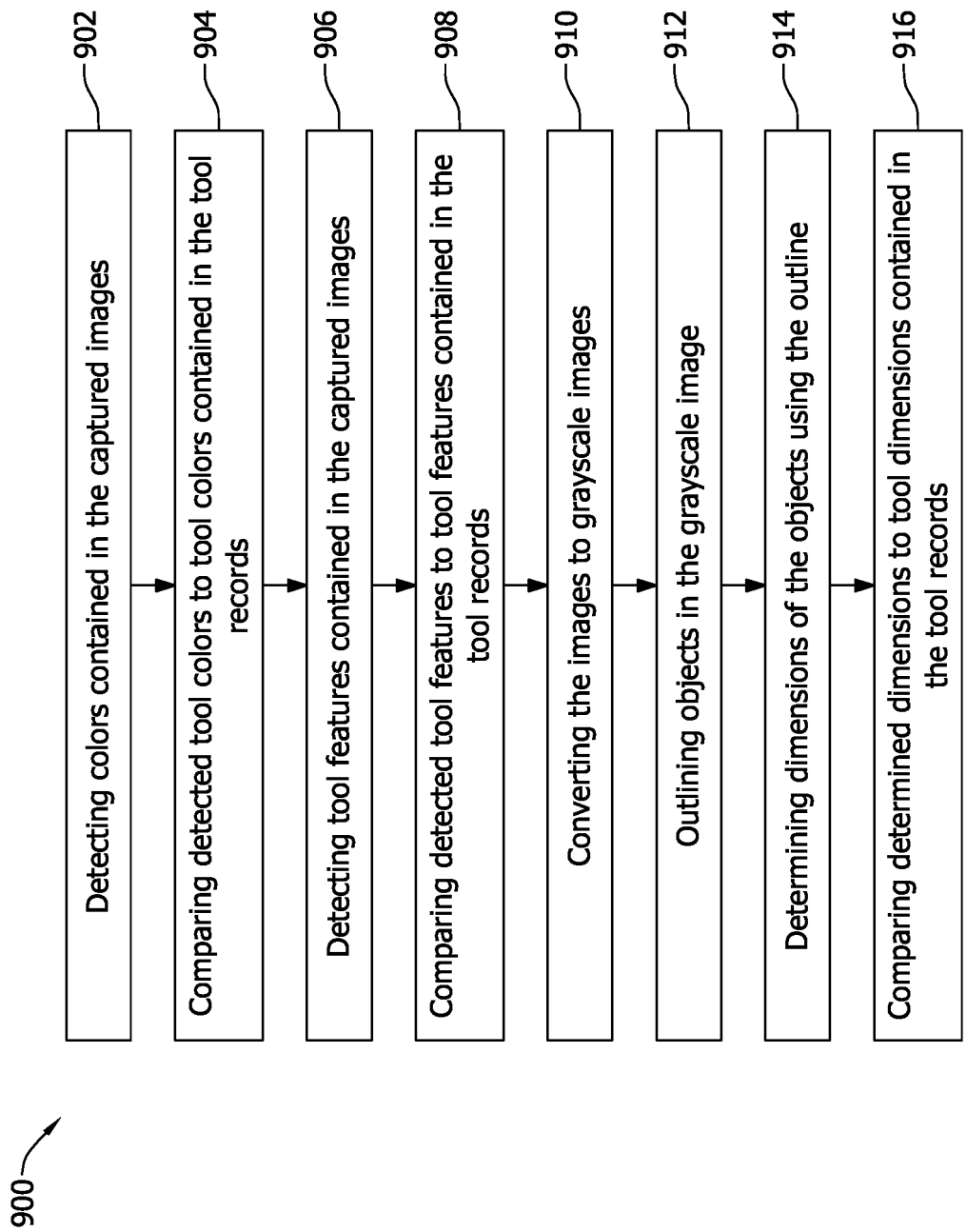
FIG. 9 is a flow chart of an exemplary method of analyzing images for use with the safety system shown in FIGS. 1A and 1B.

FIG. 9 is a flow chart of an exemplary method 900 for identifying one or more tools 110 captured in the images 124 for use with the system 100. Method 900 enables the system 100 to monitor one or more tools 110 within a hazardous electrical environment or contained within the toolbox 114. One or more of the steps of method 900 may be used in combination with either the method 700 or the method 800. For example, one or more steps of method 900 may be used in combination with method 700 to analyze images 124 to identify one or more tools 110 contained within the toolbox 114 and/or to determine that one or more tools 110 are absent from the toolbox 114. Additionally, and/or alternatively, one or more steps of the method 900 may be used in combination with method 800 to analyze the images 124 to identify tools 110 disposed within the hazard zone 524 and/or to identify tools 110 which cross the virtual boundary 520.

The exemplary method 900 includes the monitoring computing device 130 detecting 902 one or more colors contained in the images 124. Upon detecting 902 one or more colors contained in the images 124, the method 900 includes the monitoring computing device 130 comparison 904 of the detected colors to tool colors 146 contained in tool records 138 contained in the tool database 136. The tool color comparison 904 allows the monitoring computing device 130 to identify tools 110 contained in the images 124 by identifying matches between the detected tool colors and the tool colors 146 contained in tool records 138. In some embodiments, method 900 further includes generating two lists, an identified tool list and a potentially absent tool list. The identified tool list is associated with one or more tools 110 having tool colors 146 that matched tool colors detected in the images 124. The potentially absent list is associated with tools 110 not yet identified in the images 124.

In some embodiments, the potentially absent list may include one or more tool records 138 of the toolbox inventory list 150 that have not yet been identified. For example, in some embodiments, the method 900 further includes filtering the toolbox inventory list 150 by removing tools 110 that have been identified, based on the tool color comparison 904, to generate a first filtered list. The first filtered list of tools 110 is associated with tools 110 that have not yet been identified within the images 124 and/or tools 110 that are absent from the toolbox 114.

The method 900 further includes detecting 906, using the monitoring computing device 130, one or more tool features captured in the images 124. The method further includes comparing 908, using the monitoring computing device 130, the detected tool features to tool features 144 contained in the tool records 138 of the tool database 136. In some embodiments, comparing 908 includes comparing the identified one or more tools 110 features to tool features 144 contained in tool records 138 of the toolbox inventory list 150. The tool feature comparison 908 allows the monitoring computing device 130 to identify tools 110 that contained in the images 124 by identifying matches between the detected tool features and tool features 144 contained in tool records 138.

The method 900 may further include generating two lists, an identified list, and a potentially absent list. The identified list is associated with a list of tools 110 having colors and/or features detected in the images 124 that match tool colors 146 and tool features 144 contained in tool records. The potentially absent list is associated with tools 110 not yet identified in the images 124.

In some embodiments, comparing 908 includes the monitoring computing device 130 comparing the detected tool features to tool features 144 contained in the tool records 138 contained in the first filtered list. The potentially absent list may include one or more tool records 138 of the toolbox inventory list 150 that have not yet been identified. For example, in some embodiments, the method 900 further include filtering the toolbox inventory list 150 by removing tools records 138 that have been identified in the images 124, based on the color comparison and/or the feature comparison, to generate a second filtered list. The second filtered list of tools 110 is associated with tools 110 that have not yet been identified within the images 124 and/or tools 110 that are absent from the toolbox 114.

The method 900 further includes converting 910, using the monitoring computing device 130, the images 124 into grayscale images 124. The method further includes outlining 912 a boundary of objects contained in the grayscale images 124. The method 900 includes determining 914 using the monitoring computing device 130, one or more dimensions based on, at least in part, the boundary of objects. The method 900 includes comparing 916 the determined dimensions to the tool dimensions 148 contained in the tool records 138. The tool dimension comparison 916 allows the monitoring computing device 130 to identify tools 110 that contained in the images 124 by identifying matches between the determined tool dimensions and tool dimensions 148 contained in tool records 138.

The method 900 may include filtering, using the monitoring computing device 130, the toolbox inventory list 150 by removing tools 110 that have been identified, by at least one of the color comparison 904, the tool feature comparison 908, and/or the tool dimension comparison 916, to generate a third filtered list. The third filtered list is associated with tools 110 that have not yet been identified within the images 124 and/or tools 110 that are absent from the toolbox 114.

The method 900 includes identifying, by the monitoring computing device 130, an absent tool list. The absent tool list includes one or more tools that are listed on the toolbox inventory list 150 but were not identified in the images 124.

Figure 10:
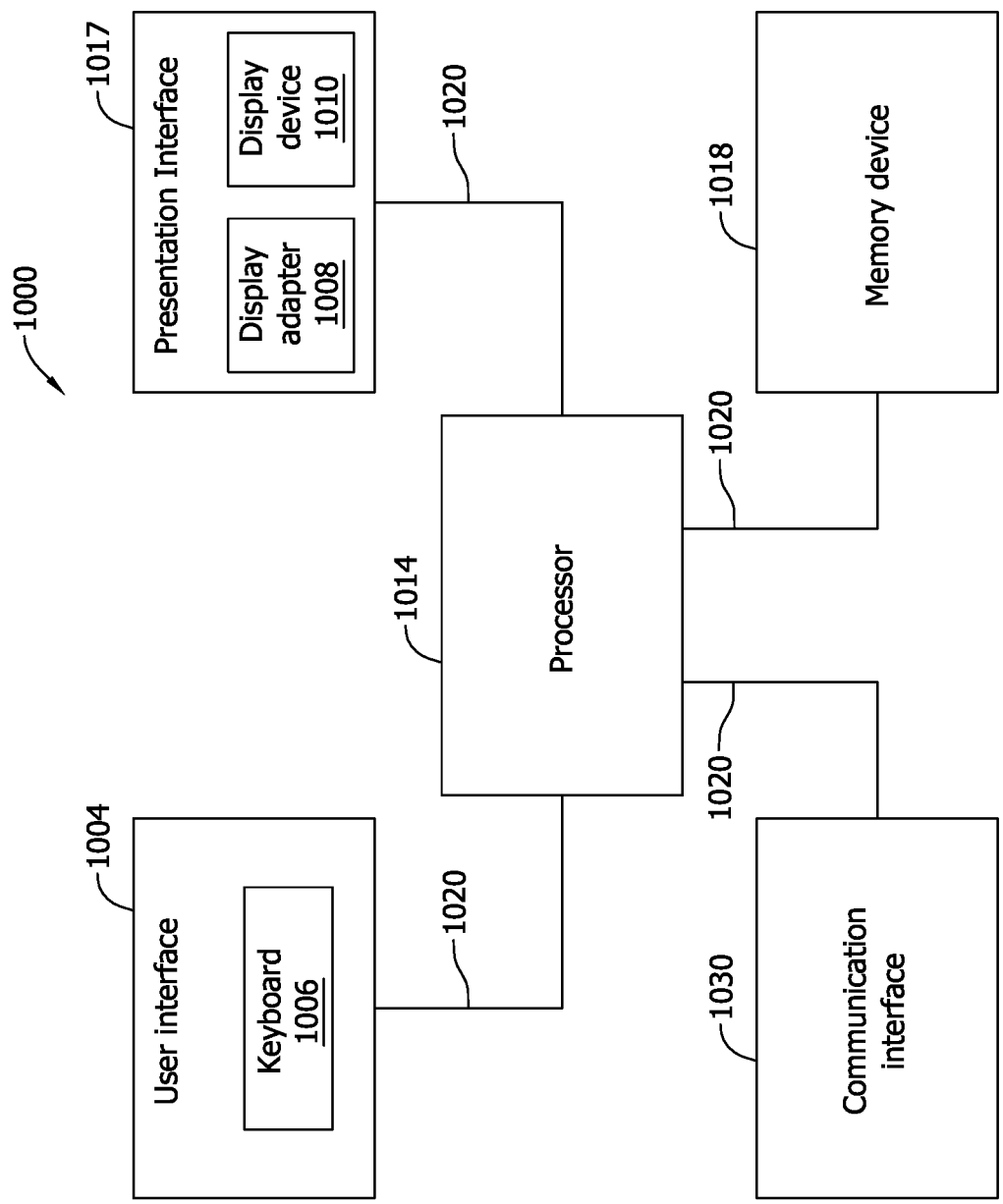
FIG. 10 is a block diagram of an exemplary user computing device shown in FIGS. 1A and 1B.

FIG. 10 is a block diagram of an exemplary computing device 1000. In the exemplary embodiment, the computing device 1000 includes a user interface 1004 that receives at least one input from the user 162. The user interface 1004 may include a keyboard 1006 that enables the user 162 to input pertinent information. The user interface 1004 may also include, for example, a pointing device, a mouse, a stylus, a touch sensitive panel (e.g., a touch pad and a touch screen), a gyroscope, an accelerometer, a position detector, and/or an audio input interface (e.g., including a microphone).

Moreover, in the exemplary embodiment, computing device 1000 includes a presentation interface 1017 that presents information, such as input events and/or validation results, to the user 162. The presentation interface 1017 may also include a display adapter 1008 that is coupled to at least one display device 1010. More specifically, in the exemplary embodiment, the display device 1010 may be a visual display device, such as a cathode ray tube (CRT), a liquid crystal display (LCD), a light-emitting diode (LED) display, and/or an "electronic ink" display. Alternatively, the presentation interface 1017 may include an audio output device (e.g., an audio adapter and/or a speaker) and/or a printer.

The computing device 1000 also includes a processor 1014 and a memory device 1018. The processor 1014 is coupled to the user interface 1004, the presentation interface 1017, and the memory device 1018 via a system bus 1020. In the exemplary embodiment, the processor 1014 communicates with the user 162, such as by prompting the user 162 via the presentation interface 1017 and/or by receiving user 162 inputs via the user interface 1004. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, the memory device 1018 includes one or more devices that enable information, such as executable instructions and/or other data, to be stored and retrieved. Moreover, the memory device 1018 includes one or more computer readable media, such as, without limitation, dynamic random-access memory (DRAM), static random access memory (SRAM), a solid state disk, and/or a hard disk. In the exemplary embodiment, the memory device 1018 stores, without limitation, application source code, application object code, configuration data, additional input events, application states, assertion statements, validation results, and/or any other type of data. The computing device 1000, in the exemplary embodiment, may also include a communication interface 1030 that is coupled to the processor 1014 via the system bus 1020. Moreover, the communication interface 1030 is communicatively coupled to data acquisition devices.

In the exemplary embodiment, the processor 1014 may be programmed by encoding a task using one or more executable instructions and providing the executable instructions in the memory device 1018. In the exemplary embodiment, the processor 1014 is programmed to select a plurality of measurements that are received from data acquisition devices.

In task, a computer executes computer-executable instructions embodied in one or more computer-executable components stored on one or more computer-readable media to implement aspects of the disclosure described and/or illustrated herein. The order of execution or performance of the tasks in embodiments of the disclosure illustrated and described herein is not essential, unless otherwise specified. That is, the tasks may be performed in any order, unless otherwise specified, and embodiments of the disclosure may include additional or fewer tasks than those disclosed herein. For example, it is contemplated that executing or performing a particular task before, contemporaneously with, or after another task is within the scope of aspects of the disclosure.

Figure 11:
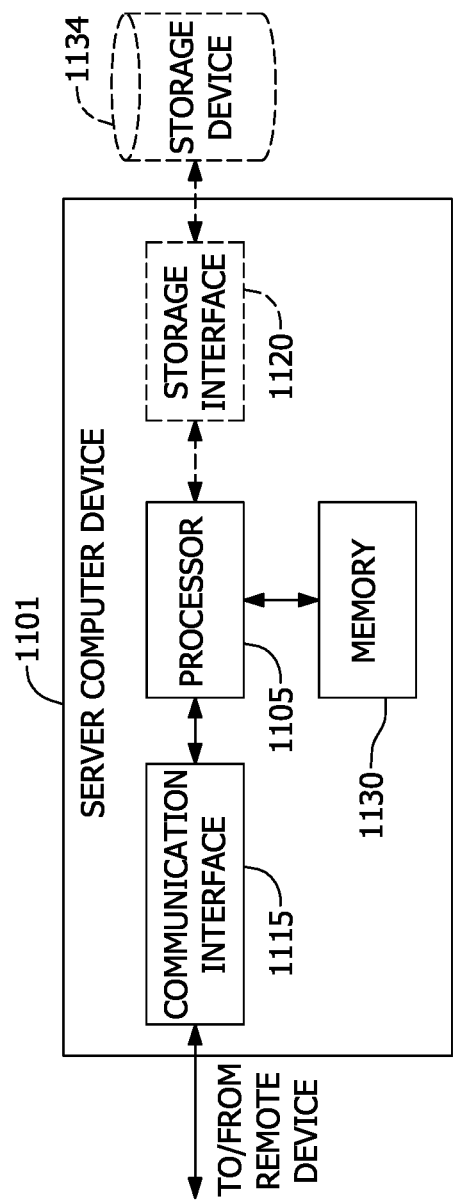
FIG. 11 is a block diagram of an exemplary server computing device shown in FIGS. 1A and 1B.

FIG. 11 illustrates an exemplary configuration of a server computer device 1101 such as the monitoring computing device 130. The server computer device 1101 also includes a processor 1105 for executing instructions. Instructions may be stored in a memory area 1130, for example. The processor 1105 may include one or more processing units (e.g., in a multi-core configuration).

The processor 1105 is operatively coupled to a communication interface 1115 such that server computer device 1101 is capable of communicating with a remote device such as the monitoring computing device 130, the user computing device 160, or another server computer device 1101. For example, communication interface 1115 may receive data from the monitoring computing device 130 and the user computing device 160, via the Internet.

The processor 1105 may also be operatively coupled to a storage device 1134. The storage device 1134 is any computer-operated hardware suitable for storing and/or retrieving data, such as, but not limited to, wavelength changes, temperatures, and strain. In some embodiments, the storage device 1134 is integrated in the server computer device 1101. For example, the server computer device 1101 may include one or more hard disk drives as the storage device 1134. In other embodiments, the storage device 1134 is external to the server computer device 1101 and may be accessed by a plurality of server computer devices 1101. For example, the storage device 1134 may include multiple storage units such as hard disks and/or solid-state disks in a redundant array of inexpensive disks (RAID) configuration. The storage device 1134 may include a storage area network (SAN) and/or a network attached storage (NAS) system.

In some embodiments, the processor 1105 is operatively coupled to the storage device 1134 via a storage interface 1120. The storage interface 1120 is any component capable of providing the processor 1105 with access to the storage device 1134. The storage interface 1120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1105 with access to the storage device 1134.

At least one technical effect of the systems and methods described herein includes (a) real-time and automatic monitoring a plurality of tools within an electrical power system, (b) real-time and automatic monitoring of an electric panel within an electric power system; (c) real-time and automatic monitoring of a toolbox and detection of absent tools 110 not contained in the toolbox (d) real-time and automatic warning systems for altering a user to account of all of the plurality of tools, and (e) real-time display, on a user computing device, of images and videos of the monitored tools, the electric panel, and the toolbox.

In one embodiment, a safety system for managing a plurality of tools is provided. The system includes a toolbox including an interior surface defining a cavity. The toolbox is configured to store the plurality of tools within the cavity. The system includes at least one camera coupled to the toolbox. The at least one camera captures a plurality of images, in-real time, of at least one of the interior surfaces of the toolbox, at least one of the plurality of tools stored in the cavity, and an area adjacent to the toolbox. The system further includes at least one processor communicatively coupled to the at least one camera. The processor is configured to analyze the plurality of images to identify an absent tool, the absent tool is not contained in the cavity of the toolbox and in response to identifying an absent tool, automatically transmitting a tool warning message to a user computing device, the tool warning message indicating the identified absent tool.

In another embodiment, a safety system for managing a plurality of tools in proximity to an electric panel is provided. The safety system includes at least one camera positioned in proximity to the electric panel. The camera is configured to capture a plurality of images of tools used in proximity to the electric panel. The safety system further includes a processor communicatively coupled to the at least one camera. The processor is configured to generate a virtual boundary in proximity to the electric panel, the virtual boundary spans between a hazard zone and a safe zone, and the camera is configured to capture images of tools crossing the virtual boundary. The processor further is configured to analyze the plurality of images to determine if a tool has crossed the virtual boundary from the safe zone into the hazard zone. The processor is further configured to analyze the plurality of images to determine if the tool has crossed the virtual boundary from the hazard zone into the safe zone. The processor is configured to transmit a warning message to a user computing device when the tool has crossed the virtual boundary into the hazard zone but did not subsequently cross the virtual boundary into the safe zone.

In yet another embodiment, a safety system for managing a plurality of tools in proximity to an electric panel and with a toolbox is provided. The system includes at least one camera positioned in proximity to the electric panel. The camera is configured to capture a plurality of images of tools used in proximity to the electric panel and at least one camera coupled to the toolbox, wherein the at least one camera is configured to capture images, in-real time, of at least one of an interior surface of the toolbox, at least one of the plurality of tools stored in a cavity, and an area adjacent to the toolbox. The system further includes a processor communicatively coupled to the at least one camera. The processor is configured to generate a virtual boundary in proximity to the electric panel. The virtual boundary spans between a hazard zone and a safe zone. The camera is configured to capture images of tools crossing the virtual boundary. The processor is further configured to analyze the plurality of images to determine if a tool has crossed the virtual boundary from the safe zone into the hazard zone and analyze the plurality of images to determine if the tool has crossed the virtual boundary from the hazard zone into the safe zone. The processor is further configured to analyze the images to identify an absent tool, the absent tool is not contained in the cavity of the toolbox. The processor is further configured to, in response to at least one of identifying an absent tool and determining that the tool has crossed the virtual boundary into the hazard zone but did not subsequently cross the virtual boundary into the safe zone, transmit a warning message to a user computing device.

The benefits and advantages of the inventive concepts are now believed to have been amply illustrated in relation to the exemplary embodiments disclosed. While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments, certain components in the assemblies described may be omitted to accommodate types of fuses or the needs of particular installations, while still providing the needed performance and functionality of the fuses.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A safety system for managing a plurality of tools, the safety system comprising:
   a toolbox comprising an interior surface defining a cavity, wherein the toolbox is configured to store the plurality of tools within the cavity;
   a lid configured to cover an opening of the toolbox;
   a smart lock;
   at least one camera coupled to the toolbox, wherein the at least one camera is configured to capture a plurality of images, in-real time, of at least one of the interior surface of the toolbox, at least one of the plurality of tools stored in the cavity, and an area adjacent to the toolbox;

at least one processor communicatively coupled to the at least one camera and the smart lock, wherein the processor is configured to:
  analyze the plurality of images to identify an absent tool, the absent tool is not contained in the cavity of the toolbox;
  in response to identifying an absent tool, automatically transmitting a tool warning message to a user computing device, the tool warning message indicating the identified absent tool; and
  transmit a signal to the smart lock causing the smart lock to prevent the lid from covering the opening.

2. The safety system of claim 1, wherein the smart lock is configured to perform at least one of i) enabling the lid and toolbox to be locked when the lid covers the opening and ii) preventing the lid and toolbox from being locked, when the lid covers the opening, the smart lock is communicatively coupled to the processor, wherein the processor is further configured to:
  when an absent tool is not identified, transmit a signal to the smart lock causing the smart lock to allow the lid to cover the opening.

3. The safety system of claim 1, wherein the safety system further comprises:
  a warning system positioned in proximity to the toolbox, the warning system communicatively coupled to the processor and configured to provide a warning signal, the warning system comprising at least one of i) a speaker configured to generate an audible warning signal, ii) a visual device configured to generate a visual warning signal and iii) a vibration device configured to generate a tactile warning signal, wherein the processor is further configured to:
  when an absent tool is identified, transmit a signal to the warning system causing the warning system to provide the warning signal to alert a user that a tool is absent from the toolbox.

4. The safety system of claim 1, wherein the processor is further configured to:
  analyze the images, in real-time, to determine at least one of i) a tool is actively being removed from the toolbox and ii) a tool is actively being placed into the toolbox.

5. The safety system of claim 4, wherein the processor is communicatively coupled to a tool database storing a plurality of tool records each associated with a tool, and wherein the processor is further configured to:
  if the processor determines that a tool is being placed into the toolbox, update the tool database by adding a tool record associated with the tool being placed into the toolbox to the tool database; and
  if the processor determines that a tool is being removed from the toolbox, update the tool database by marking a tool record associated with the removed tool as being checked out.

6. The safety system of claim 1, wherein the processor is communicatively coupled to a memory, the memory comprising a tool database storing a plurality of individual tool records, wherein each individual tool record is associated with a tool, the tool record includes at least one image of the tool and one or more tool colors of the tool, wherein analyzing the images further comprises:
  receive a plurality of images from the at least one camera;
  detect colors contained in the images;
  filter the tool database by comparing the detected colors to the tool colors contained in the tool records to generate a first filtered set of tool records, the first filtered set of tool records includes tool records having tool colors not detected in the images, wherein the first filtered set of tool records is associated with tools not yet identified in the images;
  detect tool features contained in the images;
  filter the first filtered set of tool records by comparing the detected tool features to the tool features contained in the first filtered set of tool records to generate a second filtered set of tool records, the second filtered set of tool record includes tools having tool features not detected in the images, wherein the second filtered set of tool records is associated with tools not yet identified in the images; and
  identify absent tools not detected in the images based on the second set of filtered tool records.

7. The safety system of claim 6, wherein the tool records further comprise one or more tool features of the tool, and wherein analyzing the images further comprises:
  convert the plurality of images into a plurality of grayscale images;
  outline a boundary of one or more tools contained in the plurality of grayscale images;
  determine a dimension of the tool using the outline; and
  filter the second set of tool records by comparing the determined dimension with tool dimensions contained within the second filtered set of tool records to create a third filtered set of tool records, wherein the third filtered set of tool records contains tools having tool dimensions not determined from the plurality of images, and the third filtered tools set is associated with tools not yet detected in the images; and
  identify absent tools not detected in the images based on the third set of filtered tool records.

8. The safety system of claim 7, wherein the user computing device is communicatively coupled to the at least one camera, the user computing device comprises a display configured to display images captured by the at least one camera in real-time.

9. The safety system of claim 1, wherein the processor is further configured to:
  generate a virtual boundary in proximity to the toolbox, wherein the virtual boundary spans between a hazard zone and a safe zone, and wherein the camera is configured to capture images of tools crossing the virtual boundary;
  analyze the plurality of images to determine if a tool has crossed the virtual boundary from the safe zone into the hazard zone; and
  analyze the plurality of images to determine if the tool has crossed the virtual boundary from the hazard zone into the safe zone, wherein the processor is configured to transmit a warning message to a user computing device when the tool has crossed the virtual boundary into the hazard zone but did not subsequently cross the virtual boundary into the safe zone.

10. A safety system for managing a plurality of tools in proximity to an electric panel, the system comprising:
  at least one camera positioned in proximity to the electric panel, the camera is configured to capture a plurality of images of tools used in proximity to the electric panel,
  a processor communicatively coupled to the at least one camera, wherein the processor is configured to:
  generate a virtual boundary in proximity to the electric panel, wherein the virtual boundary spans between a hazard zone and a safe zone, and wherein the camera is configured to capture images of tools crossing the virtual boundary;

analyze the plurality of images to determine if a tool has crossed the virtual boundary from the safe zone into the hazard zone; and analyze the plurality of images to determine if the tool has crossed the virtual boundary from the hazard zone into the safe zone, wherein the processor is configured to transmit a warning message to a user computing device when the tool has crossed the virtual boundary into the hazard zone but did not subsequently cross the virtual boundary into the safe zone.

11. The safety system of claim 10, wherein the hazard zone comprises one or more electric components, wherein tools in the hazard zone pose an arcing risk to the electrical components.

12. The safety system of claim 10, wherein the safety system further includes:

a toolbox comprising an interior surface defining a cavity, wherein the toolbox is configured to store the plurality of tools within the cavity, wherein the at least one camera is configured to capture images, in-real time, of at least one of the interior surface of the toolbox, at least one of the plurality of tools stored in the cavity, and an area adjacent to the toolbox, and wherein the processor is further configured to:

analyze the images to identify an absent tool, the absent tool is not contained in the cavity of the toolbox; and in response to identifying an absent tool, automatically transmitting a tool warning message to a user computing device, the tool warning message indicating the identified absent tool.

13. The safety system of claim 12, wherein the user computing device is communicatively coupled to the at least one camera, the user computing device comprises a display configured to display images captured by the at least one camera in real-time.

14. The safety system of claim 12, wherein the processor is communicatively coupled to a memory, the memory comprising a tool database storing a plurality of individual tool records, wherein each individual tool record is associated with a tool, the tool record includes at least one image of the tool and one or more tool colors of the tool, wherein analyzing the images further comprises:

receive a plurality of images from the at least one camera;
detect colors contained in the images;
filter the tool database by comparing the detected colors to the tool colors contained in the tool records to generate a first filtered set of tool records, the first filtered set of tool records includes tool records having tool colors not detected in the images, wherein the first filtered set of tool records is associated with tools not yet identified in the images;
detect tool features contained in the images;
filter the first filtered set of tool records by comparing the detected tool features to the tool features contained in the first filtered set of tool records to generate a second filtered set of tool records, the second filtered set of tool record includes tools having tool features not detected in the images, wherein the second filtered set of tool records is associated with tools not yet identified in the images; and
identify absent tools not detected in the images based on the second set of filtered tool records.

15. A safety system for managing a plurality of tools in proximity to an electric panel and with a toolbox, the toolbox including an interior surface defining a cavity, the system comprising:

at least one camera positioned in proximity to the electric panel, the camera is configured to capture a plurality of images of tools used in proximity to the electric panel and at least one camera coupled to the toolbox, wherein the at least one camera is configured to capture images, in-real time, of at least one of the interior surface of the toolbox, at least one of the plurality of tools stored in the cavity, and an area adjacent to the toolbox;

a processor communicatively coupled to the at least one camera, wherein the processor is configured to:

generate a virtual boundary in proximity to the electric panel, wherein the virtual boundary spans between a hazard zone and a safe zone, and wherein the camera is configured to capture images of tools crossing the virtual boundary;

analyze the plurality of images to determine if a tool has crossed the virtual boundary from the safe zone into the hazard zone;

analyze the plurality of images to determine if the tool has crossed the virtual boundary from the hazard zone into the safe zone;

analyze the images to identify an absent tool, the absent tool is not contained in the cavity of the toolbox; and in response to at least one of identifying an absent tool and determining that the tool has crossed the virtual boundary into the hazard zone but did not subsequently cross the virtual boundary into the safe zone, transmit a warning message to a user computing device.

16. The safety system of claim 15, wherein the safety system further comprises:

a warning system positioned in proximity to the toolbox, the warning system communicatively coupled to the processor and configured to provide a warning signal, the warning system comprising at least one of i) a speaker configured to generate an audible warning signal, ii) a visual device configured to generate a visual warning signal and iii) a vibration device configured to generate a tactile warning signal, wherein the processor is further configured to:

transmit a signal to the warning system causing the warning system to provide the warning signal to alert a user that a tool is absent from the toolbox.

17. The safety system of claim 15, wherein the processor is further configured to:

analyze the images, in real-time, to determine at least one of i) a tool is actively being removed from the toolbox and ii) a tool is actively being placed into the toolbox.

18. The safety system of claim 15, wherein the processor is communicatively coupled to a tool database storing a plurality of tool records each associated with a tool, and wherein the processor is further configured to:

if the processor determines that a tool is being placed into the toolbox, update the tool database by adding a tool record associated with the tool being placed into the toolbox to the tool database; and if the processor determines that a tool is being removed from the toolbox, update the tool database by marking a tool record associated with the removed tool as being checked out.

19. The safety system of claim 15, wherein the user computing device is communicatively coupled to the at least one camera, the user computing device comprises a display configured to display images captured by the at least one camera in real-time.

20. The safety system of claim 15, wherein the processor is communicatively coupled to a memory, the memory comprising a tool database storing a plurality of individual tool records, wherein each individual tool record is associated with a tool, the tool record includes at least one image of the tool and one or more tool colors of the tool, wherein analyzing the images further comprises:
- receive a plurality of images from the at least one camera;
- detect colors contained in the images;
- filter the tool database by comparing the detected colors to the tool colors contained in the tool records to generate a first filtered set of tool records, the first filtered set of tool records includes tool records having tool colors not detected in the images, wherein the first filtered set of tool records is associated with tools not yet identified in the images;
- detect tool features contained in the images;
- filter the first filtered set of tool records by comparing the detected tool features to the tool features contained in the first filtered set of tool records to generate a second filtered set of tool records, the second filtered set of tool record includes tools having tool features not detected in the images, wherein the second filtered set of tool records is associated with tools not yet identified in the images; and
- identify absent tools not detected in the images based on the second set of filtered tool records.

* * * * *